US012809885B2

(12) United States Patent
Cha et al.

(10) Patent No.: US 12,809,885 B2
(45) Date of Patent: Nov. 24, 2026

(54) DATA PROCESSING METHOD, BLOCKCHAIN NODE, AND BLOCKCHAIN SYSTEM

(71) Applicant: HUAWEI TECHNOLOGIES CO., LTD., Shenzhen (CN)

(72) Inventors: Junhao Cha, Hangzhou (CN); Yulong Luo, Hangzhou (CN); Xiangshi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 18/895,849

(22) Filed: Sep. 25, 2024

(65) Prior Publication Data

US 2025/0021581 A1 Jan. 16, 2025

Related U.S. Application Data

(63) Continuation of application No. PCT/CN2022/083235, filed on Mar. 26, 2022.

(51) Int. Cl.
*G06F 16/20* (2019.01)
*G06F 16/23* (2019.01)
*G06F 16/27* (2019.01)

(52) U.S. Cl.
CPC ........ *G06F 16/278* (2019.01); *G06F 16/2358* (2019.01)

(58) Field of Classification Search
None
See application file for complete search history.

(56) References Cited

U.S. PATENT DOCUMENTS 11,743,051 B2 * 8/2023 Javaid .................... G06F 21/64 713/176
11,823,194 B2 * 11/2023 Yang ...................... G06F 21/32
2020/0052884 A1 * 2/2020 Tong ..................... H04L 9/3297
(Continued)

FOREIGN PATENT DOCUMENTS

CN 111984421 A 11/2020
CN 112017050 A 12/2020

OTHER PUBLICATIONS

Parth Thakkar et al: "Scaling Hyperledger Fabric Using Pipelined Execution and Sparse Peers", arxiv.org, Cornell University Library, 201 Olin Library Cornell University Ithaca, NY 14853, Mar. 11, 2020 (Mar. 11, 2020), XP081619268, total 13 pages.

*Primary Examiner* — Jau Shya Meng
(74) *Attorney, Agent, or Firm* — WOMBLE BOND DICKINSON (US) LLP

(57) ABSTRACT

This application relates to a data processing method, a blockchain node, and a blockchain system. The method includes: acquiring a read set of a first transaction, and acquiring a first block height, where the first block height is a maximum block height in the blockchain system when the first transaction is endorsed, and a cache of the first node stores write sets included in a plurality of flushed blocks in the blockchain system and block heights corresponding to the plurality of flushed blocks; and when the first block height falls within a range of the block heights corresponding to the plurality of flushed blocks, obtaining validity of the first transaction based on the read set of the first transaction and the write sets included in the plurality of flushed blocks.

19 Claims, 15 Drawing Sheets

(56) References Cited

U.S. PATENT DOCUMENTS

| | | | | |
|---|---|---|---|---|
| 2021/0318859 | A1 | 10/2021 | Narayanam et al. | |
| 2022/0131704 | A1* | 4/2022 | Javaid | G06F 21/64 |
| 2022/0311595 | A1* | 9/2022 | Vukolic | G06F 9/466 |
| 2023/0185996 | A1* | 6/2023 | Jenrola | G06F 21/602<br>703/22 |
| 2025/0219845 | A1* | 7/2025 | Seidl | G06F 21/54 |

* cited by examiner

DATA PROCESSING METHOD, BLOCKCHAIN NODE, AND BLOCKCHAIN SYSTEM

CROSS-REFERENCE TO RELATED APPLICATION

This application is a continuation of International Application No. PCT/CN2022/083235, filed on Mar. 26, 2022, the disclosure of which is hereby incorporated by reference in its entirety.

TECHNICAL FIELD

This application relates to the field of data processing technologies, and specifically, to a data processing method, a blockchain node, and a blockchain system.

BACKGROUND

A blockchain is a distributed ledger that is formed by connecting data blocks in sequence and that is in a chain data structure. The blockchain has advantages such as decentralization, tamper resistance, and traceability, and has a wide application prospect in a plurality of fields.

A blockchain in an execute-order-validate (EOV) architecture has a transaction procedure in which read and write are separated, can provide better system performance, and is widely applied. On the blockchain in the EOV architecture, isolation validation needs to be first completed before transaction data is submitted to the blockchain. Therefore, whether the isolation validation can be efficiently completed has significant impact on performance of a blockchain system.

SUMMARY

Embodiments of this application provide a data processing method, a blockchain node, and a blockchain system, to improve performance of the blockchain system.

According to a first aspect, a data processing method is provided, applied to a first node in a blockchain system. The method includes: acquiring a read set of a first transaction, and acquiring a first block height, where the first block height is a maximum block height in the blockchain system when the first transaction is endorsed, and a cache of the first node stores write sets included in a plurality of flushed blocks in the blockchain system and block heights corresponding to the plurality of flushed blocks; and when the first block height falls within a range of the block heights corresponding to the plurality of flushed blocks, obtaining validity of the first transaction based on the read set of the first transaction and the write sets included in the plurality of flushed blocks.

The read set of the transaction is a key and a key value that are read by an endorser when the endorser executes the transaction (namely, the transaction endorsement) in a simulated manner or pre-executes the transaction. The write set is data generated after the transaction is executed in the simulated manner or the transaction is pre-executed, and includes a key and a key value. In an example, the key may specifically indicate an account, and the corresponding key value indicates a balance in the account. The key value in the read set is a balance in the account before the transaction is executed in the simulated manner or the transaction is pre-executed, and the key value in the write set is a balance in the account after the transaction is executed in the simulated manner or the transaction is pre-executed.

In an embodiment of this application, when a block including the first transaction is flushed, it is determined whether the first transaction is modified by a transaction in the flushed block, that is, whether the read set of the first transaction conflicts with a write set of the transaction in the flushed block. It is not difficult to understand that flushing time of the transaction that may modify the read set of the first transaction is after the endorsement of the first transaction. Therefore, when the block including the first transaction is flushed, the validity validation is performed on the first transaction. A flushed block that is flushed after the first transaction is endorsed needs to be found or determined, and validity of the first transaction is validated based on a write set in the flushed block. In addition, when the block including the first transaction is flushed and the flushing is not completed yet, the flushed block that is flushed after the first transaction is endorsed is found or determined. Therefore, the found or determined flushed block flushed after the first transaction is endorsed is specifically a block flushed in a time period from the endorsement of the first transaction to the flushing of the block including the first transaction.

The blockchain system is a distributed system without a globally unified timestamp. In addition, the endorsement of the first transaction, generation of the block including the first transaction, and validity validation on the first transaction may be completed by different blocks. Therefore, it is difficult to directly use the timestamp to indicate the time period from the endorsement of the first transaction to the flushing of the block including the first transaction. Therefore, in this embodiment of this application, the block height indicates the timestamp, and a block height interval indicates the time period.

For a block on the blockchain, a block height is a quantity of blocks between the block and a genesis block (i.e., the first block on the blockchain) on the blockchain. The block height may be used as a number of a block on the blockchain and is used to identify the block. The block may be queried based on the block height of the block. A maximum block height indicates a block that is serially connected to or flushed to the blockchain at the latest time, that is, the maximum block height is a block height of the block that is serially connected to the blockchain at the latest time. A value of the maximum block height is equal to a quantity of blocks serially connected on the blockchain. The maximum block height of the blockchain changes with an increase in the quantity of blocks serially connected to the blockchain. A minimum block height indicates the first block on the blockchain, namely, the genesis block. In addition, it should be noted that, usually, in the blockchain system, the minimum block height is 0 instead of 1. In other words, the block height is counted from 0.

In addition, it should be noted that the blockchain system described in this embodiment of this application may maintain or record one blockchain, or may maintain or record a plurality of blockchains. In this embodiment of this application, unless otherwise specified, block heights mentioned are block heights on a same blockchain. For example, the blockchain system records a blockchain G1. In this case, the first block height is a maximum block height on the blockchain G1 when the first transaction is endorsed, the plurality of flushed blocks are blocks that are serially connected to or flushed to the blockchain G1, and correspondingly, the block heights of the plurality of flushed blocks are block heights on the blockchain G1.

With reference to the foregoing descriptions, it is not difficult to understand that for a same blockchain, a block height of a block indicates flushing time of the block, and different blocks have different flushing time and different block heights. In other words, for a same blockchain, a block height may be understood as or indicate a specific moment, and a maximum block height of the blockchain indicates a current moment. Each time a block is flushed, the maximum block height changes accordingly, which is equivalent to time moving forward. In other words, a change of the maximum block height may indicate a change of the time. Therefore, the maximum block height during pre-execution of the first transaction (that is, during endorsement of the first transaction) may indicate time at which the first transaction is endorsed, that is, indicate time at which the read set of the first transaction is read.

In addition, each of the block heights corresponding to the plurality of flushed blocks indicates time at which a corresponding block is flushed. If the maximum block height of the blockchain system during endorsement of the first transaction falls within the range of the block heights corresponding to the plurality of flushed blocks, it indicates that the block flushed after the first transaction is endorsed is included in the plurality of flushed blocks. In this way, the validity of the first transaction may be obtained based on the write set of the transaction in the plurality of flushed blocks.

According to the data processing method provided in an embodiment of this application, by determining whether the maximum block height corresponding to the case in which the first transaction is endorsed falls within the range of the block heights corresponding to the plurality of flushed blocks, whether the block flushed after the first transaction is endorsed is included in the plurality of flushed blocks, that is, included in data in the cache is determined. If the block flushed after the first transaction is endorsed is included in the data in the cache, the validity validation on the first transaction may be completed based on the data in the cache. Therefore, according to the method provided in this embodiment of this application, the first node may complete the validity validation on the first transaction based on the data in the cache, and does not need to acquire data from a status database. This can reduce duration required for the validity validation on the first transaction, reduce a delay of adding the first block to the blockchain, and improve performance of the blockchain system.

In addition, according to the method provided in an embodiment of this application, the first node performs validity validation on the first transaction, so that the validity validation is slightly affected by a data scale in the status database of the first node, and a validity validation speed does not change with an increase in the data scale in the status database. This ensures performance stability of long-term running of the blockchain system.

In addition, according to the method provided in this embodiment of this application, the first node performs validity validation on the first transaction based on the data in the cache. This avoids or reduces occupation of a memory by the validity validation, and reduces impact on the status database.

In addition, according to the method provided in this embodiment of this application, the validity validation is performed on the first transaction, so that communication overheads between a processor and the memory can be reduced, and hardware resources can be saved.

In a possible embodiment, the block heights corresponding to the plurality of flushed blocks belong to an interval $[B_h-n+1, B_h]$, and when the first block height is greater than or equal to $B_h-n+1$, the first block height falls within the range of the block heights corresponding to the plurality of flushed blocks, where n is an integer greater than or equal to 1, and $B_h$ is an integer greater than or equal to 0.

In this embodiment, the plurality of flushed blocks may be n flushed blocks whose block heights are $B_h-n+1$, $B_h-n+2$, . . . , and $B_h$ respectively. By comparing the first block height (namely, the maximum block height in the blockchain system during endorsement of the first transaction) with a block height of a block with a minimum block height in the plurality of flushed blocks, it may be determined that the transaction that may modify the read set of the first transaction may be included in the plurality of flushed blocks, so that the validity validation can be performed on the first transaction based on the write sets included in the plurality of flushed blocks. This ensures completeness of the validity validation on the first transaction.

In a possible embodiment, $B_h$ is a maximum block height in the blockchain system when a block to which the first transaction belongs is generated.

In this embodiment, the plurality of flushed blocks include the maximum block height in the blockchain system corresponding to the case in which the block to which the first transaction belongs is generated. This avoids an omission of the transaction that may modify the read set of the first transaction, and ensures the completeness of the validity validation on the first transaction.

In a possible embodiment, the method further includes: when the first block height falls outside the range of the block heights corresponding to the plurality of flushed blocks, acquiring, from a status database of the first node, a first key value of a key corresponding to the read set of the first transaction; and obtaining the validity of the first transaction based on the read set of the first transaction and the first key value.

As described above, the read set includes the key and the key value. The key corresponding to the read set herein is the key in the read set.

In this embodiment, if the first block height falls outside the range of the block heights corresponding to the plurality of flushed blocks, it indicates that the transaction that may modify the read set of the first transaction may not be included in the plurality of flushed blocks. In this case, the key value of the key corresponding to the read set of the first transaction is acquired from the status database, and the validity validation is performed on the first transaction based on the key value.

Usually, the key value of the key in the status database is a latest key value of the key. Specifically, each time a block is flushed, a blockchain node (specifically, a ledger node) updates a key value of a corresponding key in the status database based on a write set of a valid transaction in the flushed block. Therefore, a key value of a key acquired from the status database is usually a latest key value of the key. Therefore, the key value of the key corresponding to the read set of the first transaction is acquired from the status database, and the validity validation is performed on the first transaction based on the key value. This ensures the completeness of the validity validation on the first transaction.

In a possible embodiment, the blockchain system further includes a first endorser and a second endorser that are configured to endorse the first transaction; and the acquiring a first block height includes: acquiring a second block height and a third block height, where the second block height is a maximum block height in the blockchain system when the first transaction is endorsed by the first endorser, and the third block height is a maximum block height in the blockchain system when the first transaction is endorsed by the second endorser; and using a smaller one in the second block height and the third block height as the first block height.

In this embodiment, when a plurality of endorsers endorse the first transaction, that is, when there are a plurality of maximum block heights when the first transaction is endorsed, a block used to validate the validity of the first transaction is determined by using a smaller block height or a minimum block height in the plurality of maximum block heights during endorsement, so that a risk of a validation result error caused by falsification of some endorsers can be avoided or reduced.

In a possible embodiment, the method further includes: acquiring a read set of a second transaction, where the first transaction and the second transaction belong to a same block; and in a process of obtaining the validity of the first transaction based on the read set of the first transaction and the write sets included in the plurality of flushed blocks, concurrently obtaining validity of the second transaction based on the read set of the second transaction. The second transaction may be all or some other transactions other than the first transaction in the block to which the first transaction belongs.

In this embodiment, when validating the validity of the first transaction based on the data in the cache, the first node may further validate validity of another transaction. In other words, validity validation on a plurality of transactions can be concurrently performed. This further reduces duration required for completing transaction validity validation in the entire block, further reduces the delay of adding the block to the blockchain, and improves the performance of the blockchain system. Validity validation on all transactions in the block to which the first transaction belongs can be concurrently performed. This greatly reduces the delay of adding the block to the blockchain, and improves the performance of the blockchain system. Alternatively, validity validation on some transactions in the block to which the first transaction belongs can be concurrently performed.

In a possible embodiment, the obtaining validity of the first transaction based on the read set of the first transaction and the write sets included in the plurality of flushed blocks includes: when the read set of the first transaction conflicts with a write set of a third transaction, determining that the first transaction is invalid, where the third transaction is included in the plurality of flushed blocks.

If the read set of the first transaction conflicts with the write set of the third transaction, that is, the read set of the first transaction conflicts with the write set of the transaction in the flushed block, it is determined that the first transaction is invalid, thereby ensuring data consistency in the blockchain system.

In a possible embodiment, the obtaining validity of the first transaction based on the read set of the first transaction and the write sets included in the plurality of flushed blocks includes: when the read set of the first transaction does not conflict with the write sets included in the plurality of flushed blocks, obtaining the validity of the first transaction based on the read set of the first transaction and a write set of another transaction, where the another transaction is a transaction other than the first transaction in the block to which the first transaction belongs.

In this embodiment, after it is validated that the read set of the first transaction does not conflict with the write set of the transaction in the flushed block, it may be further validated whether the read set of the first transaction conflicts with the write set of the another transaction in the same block, that is, whether the read set of the first transaction depends on the write set of the another transaction, to avoid a valid transaction whose read set conflicts with a write set of another valid transaction in the same block.

In a possible embodiment, the obtaining the validity of the first transaction based on the read set of the first transaction and a write set of another transaction includes: when the first transaction does not depend on the write set of the another transaction, determining that the first transaction is valid; or when the first transaction depends on a write set of a fourth transaction in the another transaction, but the fourth transaction is invalid, determining that the first transaction is valid; or when the first transaction depends on a write set of a fourth transaction in the another transaction, and the fourth transaction is valid, determining that the first transaction is invalid.

In this embodiment, when the read set of the first transaction does not depend on the another transaction in the same block, or the dependent transaction is invalid, it may be determined that the first transaction is valid. When the read set of the first transaction depends on the another transaction in the same block, and the transaction on which the read set of the first transaction depends is valid, it may be determined that the first transaction is invalid, thereby ensuring the data consistency in the blockchain system.

According to a second aspect, a data processing method is provided, applied to a first node in a blockchain system. The method includes: acquiring a read set of a first transaction and a read set of a second transaction, where the first transaction and the second transaction belong to a same block; and in a process of obtaining validity of the first transaction based on the read set of the first transaction, concurrently obtaining validity of the second transaction based on the read set of the second transaction. The first transaction and/or the second transaction may include at least one transaction. In an example, the first transaction and the second transaction constitute all transactions in the same block. In an example, the first transaction and the second transaction may be some transactions in the same block.

According to the method, validity of a plurality of transactions in the same block can be simultaneously validated. This further reduces duration required for completing transaction validity validation in the entire block, further reduces a delay of adding the block to the blockchain, and improves performance of the blockchain system. Validity validation on all the transactions in the block to which the first transaction belongs can be concurrently performed. This greatly reduces the delay of adding the block to the blockchain, and improves the performance of the blockchain system. Alternatively, validity validation on the some transactions in the block to which the first transaction belongs can be concurrently performed.

In a possible embodiment, a cache of the first node stores write sets included in a plurality of flushed blocks in the blockchain system and block heights corresponding to the plurality of flushed blocks; the method further includes: acquiring a first block height, where the first block height is a maximum block height in the blockchain system when the first transaction is endorsed; and the obtaining validity of the first transaction based on the read set of the first transaction includes: obtaining the validity of the first transaction based on the read set of the first transaction and the write sets included in the plurality of flushed blocks.

In this embodiment, when validating the validity of the first transaction based on data in the cache, the first node may further validate validity of another transaction. In other words, validity validation on the plurality of transactions can be concurrently performed. This further reduces the duration required for completing the transaction validity validation in the entire block, further reduces the delay of adding the block to the blockchain, and improves the performance of the blockchain system.

In a possible embodiment, the method further includes: acquiring a second block height, where the second block height is a maximum block height in the blockchain system when the second transaction is endorsed; and the obtaining validity of the second transaction based on the read set of the second transaction includes: obtaining the validity of the second transaction based on the read set of the second transaction and the write sets included in the plurality of flushed blocks.

In this embodiment, when validating the validity of the first transaction based on the data in the cache, the first node may further validate the validity of the another transaction based on the data in the cache. In other words, the validity validation on the plurality of transactions can be concurrently performed. This further reduces the duration required for completing the transaction validity validation in the entire block, further reduces the delay of adding the block to the blockchain, and improves the performance of the blockchain system.

In a possible embodiment, the obtaining validity of the second transaction based on the read set of the second transaction includes: acquiring, from a status database of the first node, a first key value of a key corresponding to the read set of the second transaction; and obtaining the validity of the second transaction based on the read set of the second transaction and the first key value.

In this embodiment, when validating the validity of the first transaction based on the data in the cache, the first node may further validate the validity of the another transaction based on data acquired from the status database. In other words, the validity validation on the plurality of transactions can be concurrently performed. This further reduces the duration required for completing the transaction validity validation in the entire block, further reduces the delay of adding the block to the blockchain, and improves the performance of the blockchain system.

In a possible embodiment, the obtaining validity of the first transaction based on the read set of the first transaction includes: acquiring, from a status database of the first node, a second key value of a key corresponding to the read set of the first transaction; and obtaining the validity of the first transaction based on the read set of the first transaction and the second key value.

In this embodiment, the validity of the plurality of transactions is simultaneously validated based on data acquired from the status database. In other words, the validity validation on the plurality of transactions can be concurrently performed. This further reduces the duration required for completing the transaction validity validation in the entire block, further reduces the delay of adding the block to the blockchain, and improves the performance of the blockchain system.

According to a third aspect, a data processing apparatus is provided, including a functional unit configured to implement the method according to the first aspect.

According to a fourth aspect, a blockchain node is provided, including a processor and a memory, where the memory is configured to store a computer program, and the processor is configured to execute the computer program, to implement the method according to the first aspect.

According to a fifth aspect, a blockchain system is provided, including the blockchain node according to the fourth aspect, an endorser, and an orderer.

According to a sixth aspect, a computer storage medium is provided, where the computer storage medium stores a computer program, and when the computer program is executed by a processor, the method according to the first aspect is implemented.

According to a seventh aspect, an embodiment of this application provides a computer program product, including a program used to implement the method according to the first aspect.

In the solution provided in embodiments of this application, only some memory overheads and computing resources are required, so that isolation validation on the transaction in the block to be added to the blockchain can be quickly completed. This greatly reduces duration required for the isolation validation on the transaction in the block to be added to the blockchain, accelerates a speed of adding the block to the blockchain, and improves the performance of the blockchain system. In addition, in this solution, when the isolation validation is performed on the transaction, the isolation validation is slightly affected by the data scale in the status database, so that an insolation validation speed does not change with the increase in the data scale in the status database. This ensures the performance stability of the long-term running of the blockchain system. In addition, in this solution, the isolation validation on the transaction in the block to be added to the blockchain is performed based on the data cached in the memory. This avoids the occupation of the memory by the isolation validation on the transaction, reduces impact on the status database, accelerates the speed of adding the block to the blockchain, and helps the blockchain system run with high performance in a complex service scenario.

BRIEF DESCRIPTION OF DRAWINGS

FIG. 7B-1 and FIG. 7B-2 are a flowchart of a data processing method according to an embodiment of this application;

FIG. 8B-1 and FIG. 8B-2 are a flowchart of a data processing method according to an embodiment of this application;

DESCRIPTION OF EMBODIMENTS

The following describes technical solutions of embodiments of this application with reference to accompanying drawings. It is clear that the described embodiments in this specification are merely some but not all of embodiments of this application.

A blockchain is a chain data structure and is formed by serially connecting a plurality of data blocks. The blockchain may be understood as a ledger, and a data block on the blockchain is equivalent to a page in the ledger. The data block may also be referred to as a block for short, and records transaction data. Each block may include information such as transaction data, a timestamp, and a hash value of a previous block. The blockchain technology can use cryptography to protect the information recorded in the block. Based on the blockchain technology, two or more parties can effectively record transaction data, so that the transaction data cannot be forged and can be permanently validated.

An execute-order-validate architecture is a blockchain architecture. In a blockchain system using this architecture, a transaction pre-execution step, an ordering step, and a validation step need to be performed for a block to be added to the blockchain, to ensure consistency of transaction data recorded in the blocks.

Figure 1:
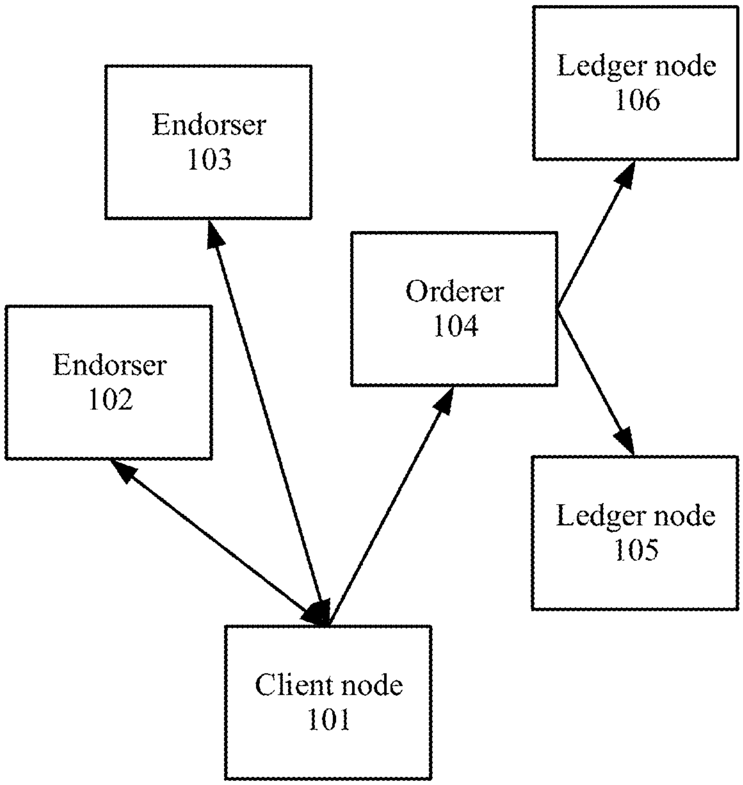
FIG. 1 is a diagram of a structure of a blockchain system according to an embodiment of this application.

FIG. 1 shows a blockchain system in an execute-order-validate architecture. The blockchain system may include at least one client node (for example, a client node 101), at least one endorser (for example, an endorser 102 and an endorser 103), at least one orderer (for example, an orderer 104), and at least one ledger node (for example, a ledger node 105 and a ledger node 106).

In the following descriptions, when the client node, the endorser, the orderer, and the ledger node are not particularly distinguished, the client node, the endorser, the orderer, and the ledger node may be referred to as blockchain nodes or nodes for short. When the endorser 102 and the endorser 103 are not particularly distinguished, the endorser 102 and the endorser 103 may be referred to as endorsers for short. When the ledger node 105 and the ledger node 106 are not particularly distinguished, the ledger node 105 and the ledger node 106 may be referred to as ledger nodes for short.

In addition, the blockchain system shown in FIG. 1 may maintain or record one blockchain, or may maintain or record a plurality of blockchains. In the following descriptions, unless otherwise specified, block heights mentioned are all block heights on a same blockchain.

In some embodiments, the blockchain node may be a physical device, for example, a server or a terminal device. In some embodiments, the blockchain node may be a virtual device. The virtual device may be a running environment virtualized by using software by a virtual machine (VM), a container, or the like. The concept includes the virtual machine and the container. In some embodiments, the blockchain node may be a process or a thread. The process is a running activity of a program in a computer about a data set and is a basic unit for a system to allocate and schedule resources. The thread is a minimum unit that an operating system can compute and schedule. The thread is included in the process and is an actual operating unit of the process.

The client node is an entity indicating a user. The client node may exchange information with another node in the blockchain system under an operation of the user, for example, initiate a transaction or create a smart contract in the blockchain system. Initiating a transaction is used as an example. The client node may construct an endorsement service request. A function of the endorsement service request is to request the endorser to invoke the smart contract to pre-execute the transaction or execute the transaction in a simulated manner, and endorse a transaction pre-execution result. The client node may send the endorsement service request to the endorser.

Figure 2:
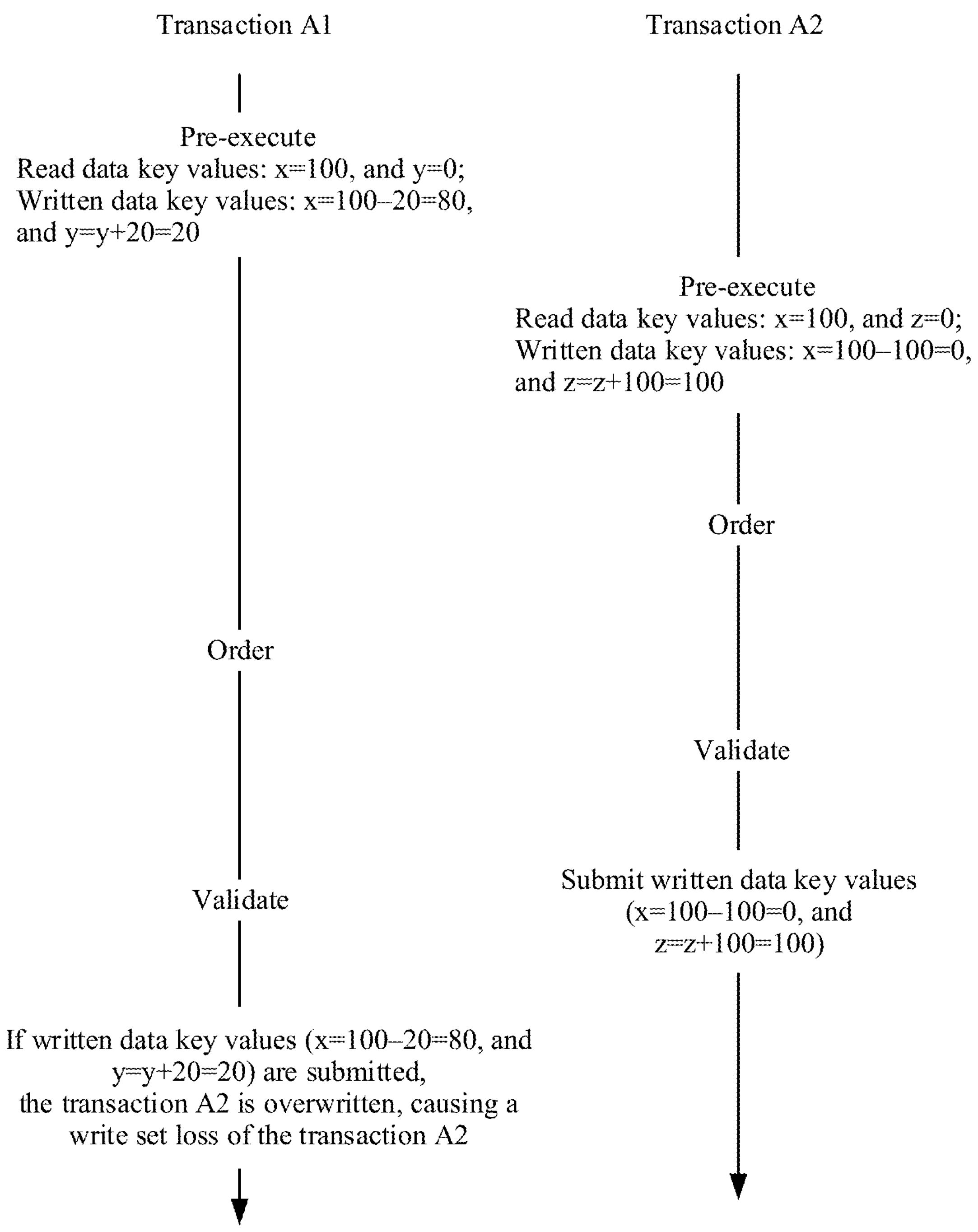
FIG. 2 is a diagram of submission of transactions that are concurrently executed.

The endorser may also be referred to as a contract execution node or a contract pre-execution node. After receiving the endorsement service request, the endorser may respond to the endorsement service request, and invoke the smart contract to execute the transaction in the simulated manner. When the transaction is executed in the simulated manner, a data key value is read. The data key value includes a key and a key value. In an example, the key may indicate an account, and the key value may indicate a balance in the account. For example, if the key is x, the key value indicates a balance in the account, for example, x=100. Read data key values indicate balances in accounts of both transaction parties before the transaction is executed. The read key and key value may be referred to as a read set. After the transaction is executed in the simulated manner, a write set may be generated. The write set includes a written data key value. For example, the key indicates an account, and the key value indicates a balance in the account. Written data key values indicate balances in the accounts of both the transaction parties after the transaction is executed. A transaction A1 shown in FIG. 2 is used as an example. Read data key values are: x=100, and y=0, where x and y indicate keys of both transaction parties, x=100 indicates that a key value of the key x is 100, and y=0 indicates that a key value of the key y is 0. Written data key values are: x=100−20=80, and y=y+20=20.

In addition, the read set and the write set may be collectively referred to as a read-write set. In addition, the read set may also be referred to as the read-write set, and the write set may also be referred to as the read-write set. Unless otherwise specified, the read-write set may be the read set and the write set, may be the read set, or may be the write set. For example, the read-write set uses a preset data structure, and includes a field F1 used to fill the read set and a field F2 used to fill the write set. In other words, the field F1 and the field F2 belong to or are included in the read-write set. Data filled in the field F1 may be the read set, and data filled in the field F2 may be referred to as the write set.

The endorser signs a read-write set of a transaction, and sends the signed read-write set to the client node.

Usually, a plurality of endorsers are required to endorse one transaction. In this way, the client node receives signed read-write sets from the plurality of endorsers. The client node may package, based on the preset data structure, the signed read-write sets received from the plurality of endorsers. The process may be referred to as constructing transaction data. The client node sends the packaged read-write sets to the orderer.

The orderer may also be referred to as a consensus node, and may order read-write sets of a plurality of transactions received in a time period. Specifically, the orderer may determine transaction sequence numbers of the plurality of transactions according to a preset consensus algorithm, and order the plurality of transactions based on the transaction sequence numbers. Then, the orderer packages related information such as the read-write sets of the ordered transactions into blocks, and sends the blocks to the ledger node.

The ledger node may perform isolation validation on the read-write sets of the transactions included in the received blocks, to ensure mutual independence between different transactions. Isolation means that when a plurality of users concurrently access a database, for example, operate a same table, a transaction (in the blockchain system, the transaction is a transaction) started by the database for each user cannot be interfered by an operation of another transaction, and a plurality of concurrent transactions need to be isolated from each other. In this way, before the block is added to the blockchain (that is, serially connected to the blockchain or written in the ledger), the isolation validation needs to be performed on the transaction in the block. For example, multi-version concurrency control (MVCC) is performed on the transaction in the block. For a transaction recorded in the block, when isolation validation on the transaction succeeds, the transaction may be marked as a valid transaction. When the isolation validation on the transaction fails, the transaction may be marked as an invalid transaction.

The transaction A1 and a transaction A2 may be set as two transactions that are concurrently executed. As shown in FIG. 2, read sets of the transaction A1 and the transaction A2 are the same, and a read-write set of the transaction A2 is first added to the blockchain, that is, the transaction A2 is confirmed by the blockchain system before the transaction A1. The key value of the key x is changed by the transaction A2, but the transaction A1 still executes the transaction based on the read set (namely, the key value before being changed by the transaction A2). As a result, the read set of the transaction A1 is inconsistent with an actual key value. If the transaction A1 is still marked as the valid transaction, after a block including a write set of the transaction A1 is added to the blockchain, the write set of the transaction A1 overwrites a write set of the transaction A2 that is first added to the blockchain. As a result, the write set of the transaction A2 is lost. Therefore, to avoid this case, before the block is added to the blockchain, the isolation validation is performed on the read-write set of the transaction included in the block.

In embodiments of this application, for ease of description, a phenomenon that the read set of the transaction is inconsistent with the actual key value during isolation validation may be referred to as a read set conflict of the transaction.

In an embodiment, the data is read from a status database of the ledger node, to validate the isolation of the transaction recorded in the block to be added to the blockchain. The status database of the ledger node stores a write set of a transaction included in a block that is added to the blockchain, namely, a latest key value that is confirmed by the blockchain system. The isolation validation includes two parts: determining whether there is a dependency relationship between transactions in a same block, and determining whether a read set of a transaction is modified by a submitted transaction. The submitted transaction is a transaction that is added to the blockchain, that is, the submitted transaction is included in the blockchain.

Figure 3:
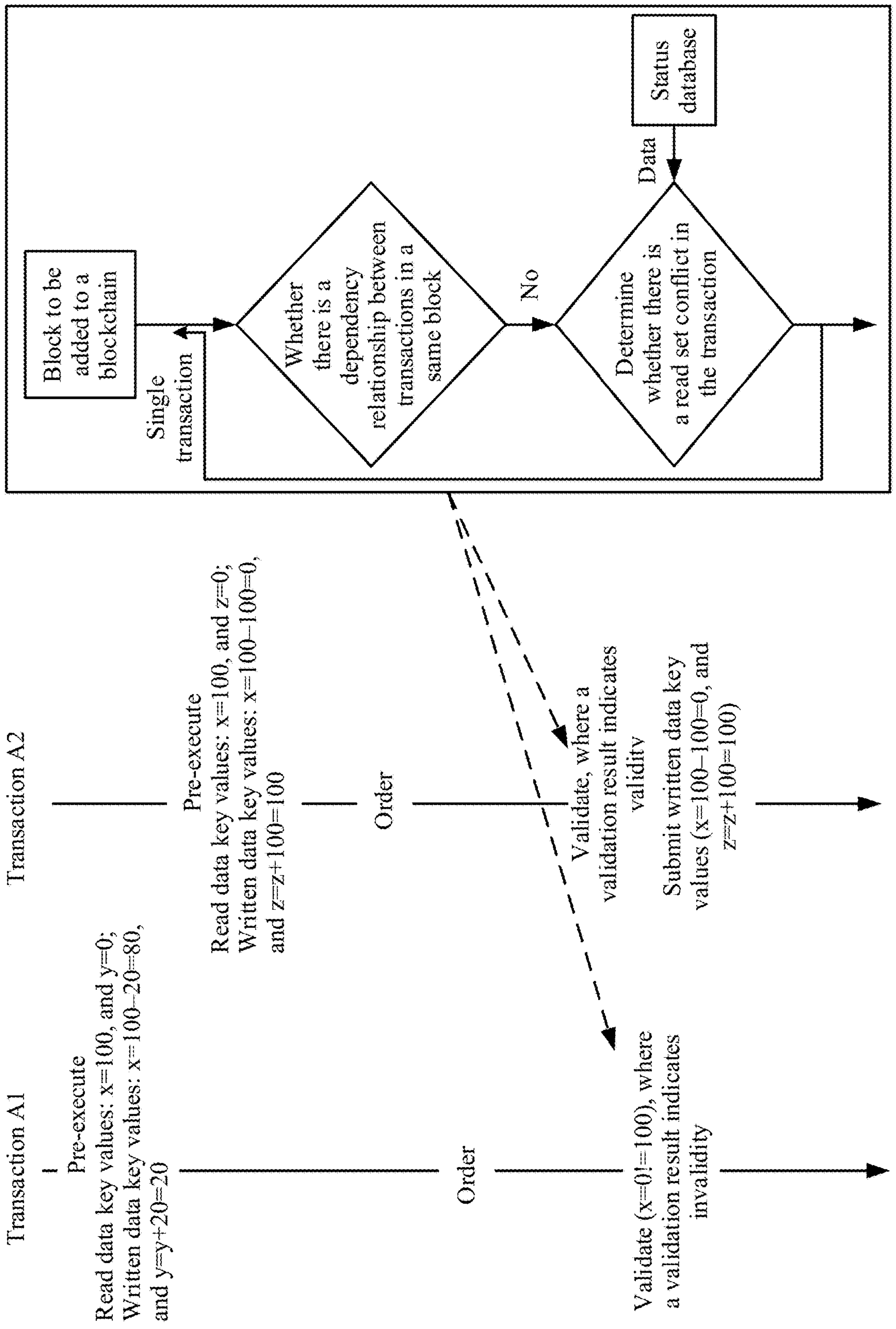
FIG. 3 is a flowchart of a transaction isolation validation method.

Referring to FIG. 3, before a block is added to the blockchain, it is first determined whether there is a dependency relationship between transactions in the block. In a same block, in an ordered transaction sequence, if a read set key of a postorder transaction is consistent with a write set key of a preorder transaction, there is a dependency relationship between the two transactions, and a read set of the postorder transaction depends on a write set of the preorder transaction. For the two transactions that have the dependency relationship, if the preorder transaction is valid, it may be determined that there is a transaction with the read set conflict in the postorder transaction, and the isolation validation fails, that is, the postorder transaction is invalid. If a transaction in the block does not depend on a preorder transaction of the transaction or a preorder transaction on which the transaction depends is invalid, a latest key value of an account corresponding to the transaction is acquired from the status database. Then, it is determined whether the latest key value of the account is consistent with a key value of the account in a read set of the transaction. If the two are consistent, the read set of the transaction is not modified by a submitted transaction, and the transaction is valid; or if the two are inconsistent, the transaction is invalid. Then, the isolation validation is performed on a next transaction in the same block until the isolation validation is performed on all transactions in the block.

In the solution as shown in FIG. 3, the data needs to be acquired from the status database. As more blocks are added to the blockchain, more data is stored in the status database of the ledger node. As a result, data retrieval and query performance of the status database deteriorate, and the isolation validation occupies longer duration, which affects performance of the blockchain system. In addition, in the solution shown in FIG. 3, interaction between a validation execution unit and the database causes overheads of a processor and a memory. When a large quantity of blocks need to be added to the blockchain, hardware resource overheads of the node are higher. In the solution as shown in FIG. 3, the isolation validation on a plurality of transactions in the block is performed in series. As a result, duration required for completing the isolation validation on the transactions in the entire block is long, and the performance of the blockchain system is also affected.

Embodiments of this application provide a data processing method. A ledger node may cache n blocks that are added to a blockchain, and validate, based on write sets of transactions in the n blocks that are added to the blockchain, whether a read set of a transaction in a block to be added to the blockchain conflicts with the write set of the transaction that is added to the blockchain, that is, determine whether the read set of the transaction in the block to be added to the blockchain is modified by the transaction that is added to the blockchain. The block that is added to the blockchain is a block that is serially connected to the blockchain, that is, the block that is added to the blockchain may also be referred to as a flushed block, and is a block that is submitted and confirmed by a blockchain system. The transaction that is added to the blockchain may also be referred to as a submitted transaction, and is a transaction included in the block that is added to the blockchain. The cached n blocks that are added to the blockchain are n blocks that are recently added to the blockchain relative to a block generation moment of the block to be added to the blockchain. For example, the block generation moment of the block to be added to the blockchain is set to a moment T1, and a moment at which a first block in the n blocks is added to the blockchain is closest to the moment T1. Duration between a moment at which a second block is added to the blockchain and the moment T1 is only greater than duration between the moment at which the first block is added to the blockchain and the moment T1. Duration between a moment at which a third block is added to the blockchain and the moment T1 is only greater than the duration between the moment at which the first block is added to the blockchain and the moment T1, and the duration between the moment at which the second block is added to the blockchain and the moment T1. The same rule applies to the rest. The block to be added to the blockchain is a block that is not serially connected to the blockchain and on which the isolation validation is about to perform or is performing. The transaction in the block to be added to the blockchain may be referred to as a transaction to be added to the blockchain or a transaction to be submitted. If the isolation validation on the transaction in the block to be added to the blockchain is completed, the block may be added to the blockchain, that is, serially connected to the blockchain. Block generation may also be referred to as consensus-based block generation, and means packaging related information such as a read-write set of at least one transaction into a block. For ease of description, that the block includes the related information such as the read-write set of the transaction may be referred to as that the block contains or includes the transaction.

In this way, the ledger node may determine, based on cached data, whether the read set of the transaction in the block that is added to the blockchain conflicts with the write set of the transaction that is added to the blockchain, and does not need to acquire data from a status database. This can reduce duration occupied by the isolation validation, reduce a delay of adding the block to the blockchain, and improve performance of the blockchain system. In addition, communication overheads between a processor and a memory are reduced, and hardware resources are saved. In other words, the n blocks that are added to the blockchain may be simultaneously used for the isolation validation on a plurality of transactions. In other words, the isolation validation on the plurality of transactions can be concurrently performed. This further reduces time required for completing the isolation validation in the entire block, further reduces the delay of adding the block to the blockchain, and improves transaction performance of the blockchain system.

The following describes the data processing method provided in embodiments of this application by using an example.

Figure 4:
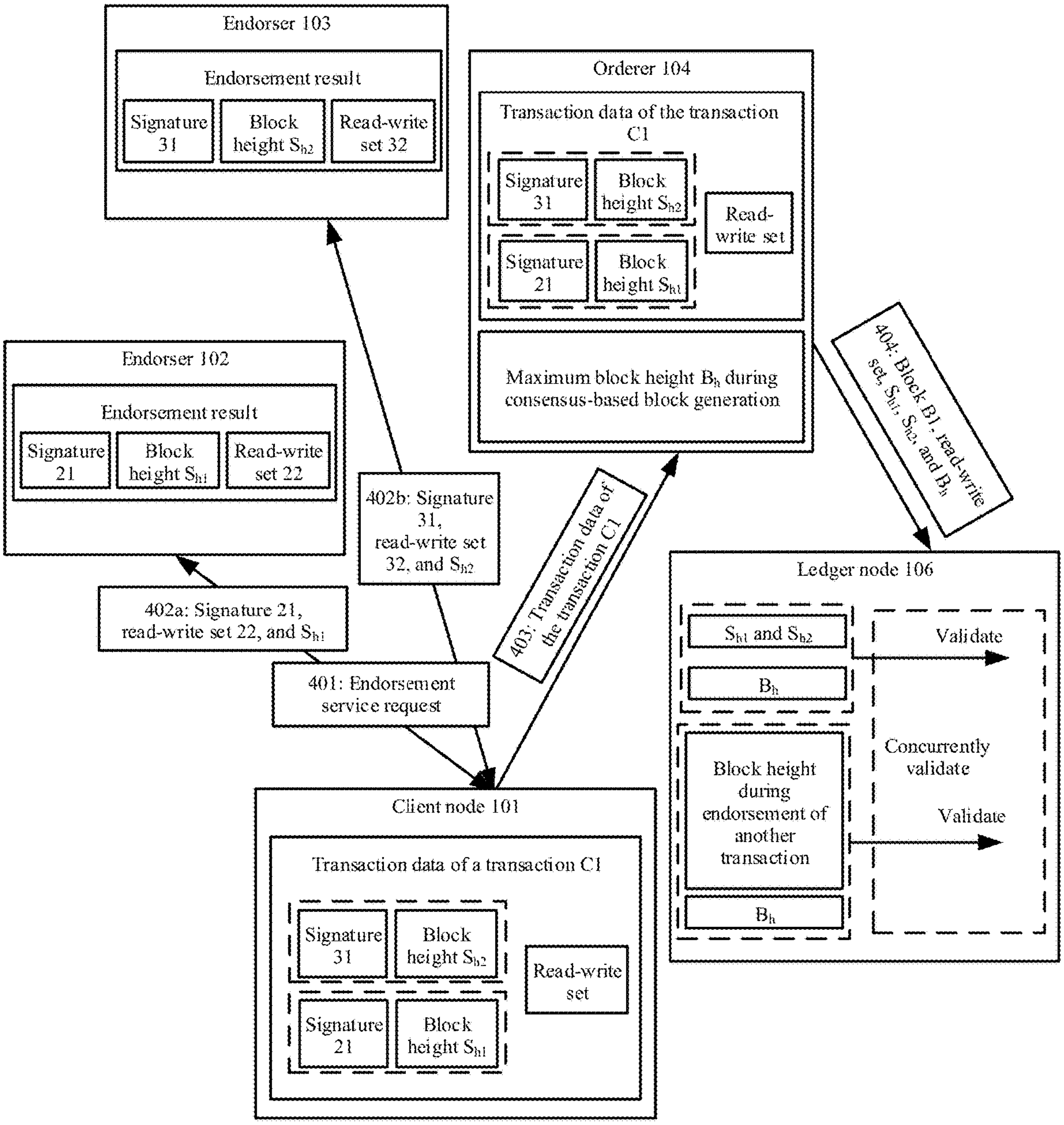
FIG. 4 is a flowchart of a data processing method according to an embodiment of this application.

Referring to FIG. 4, a client node 101 may perform operation 401, to send endorsement service requests to an endorser 102 and an endorser 103.

The endorser 102 may respond to the endorsement service request that is of a transaction C1 and that is sent by the client node 101, and pre-execute the transaction C1 or execute the transaction C1 in a simulated manner. When starting to pre-execute the transaction C1, the endorser 102 acquires a current maximum block height $S_{h1}$ of the endorser 102, acquires a read set of the transaction C1 based on the block height $S_{h1}$, and pre-executes a contract service procedure of the transaction based on the read set, to obtain a write set. Further, a read-write set 22 of the transaction C1 is obtained. The endorser 102 may sign the read-write set 22 and the block height $S_{h1}$, that is, sign a signature 21 on the read-write set 22 and the block height $S_{h1}$. The signature 21, the read-write set 22, and the block height $S_{h1}$ are then sent to the client node 101 through 402*a*. The process described above may be referred to as a process in which the endorser 102 endorses the transaction C1. The signature 21, the read-write set 22, and the block height $S_{h1}$ may be collectively referred to as an endorsement result of the transaction C1 by the endorser 102.

In embodiments of this application, "pre-executing the contract service procedure of the transaction" may be referred to as pre-executing the transaction for short.

Similarly, the endorser 103 may respond to the endorsement service request that is of the transaction C1 and that is sent by the client node 101, and pre-execute the transaction C1 or execute the transaction C1 in a simulated manner. When starting to pre-execute the transaction C1, the endorser 103 acquires a current maximum block height $S_{h2}$ of the endorser 103, acquires the read set of the transaction C1 based on the block height $S_{h2}$, and pre-executes the transaction based on the read set, to obtain a write set. Further, a read-write set 32 of the transaction C1 is obtained. The endorser 103 may sign the read-write set 32 and the block height $S_{h2}$, that is, sign a signature 31 on the read-write set 32 and the block height $S_{h2}$. The signature 31, the read-write set 32, and the block height $S_{h2}$ are then sent to the client node 101 through 402*b*. The process described above may be referred to as a process in which the endorser 103 endorses the transaction C1. The signature 31, the read-write set 32, and the block height $S_{h2}$ may be collectively referred to as an endorsement result of the transaction C1 by the endorser 103.

It should be understood that, usually, an endorser may also be used as a ledger node, and stores a blockchain, that is, stores a ledger. For an endorser that does not have a ledger node function, the blockchain may be acquired from the ledger node, or in other words, the ledger node may synchronize the blockchain to the endorser. For example, each time a block is added to the blockchain, the ledger node may synchronize, to the endorser, a blockchain including the block that is newly added to the blockchain. In this way, the endorser may acquire a maximum block height of the endorser based on the blockchain stored in the endorser.

In addition, for ease of description, a current maximum block height of the endorser acquired when the endorser starts to pre-execute the transaction C1 may be referred to as a maximum block height during endorsement of the transaction C1. For the transaction C1, one endorser may acquire one maximum block height during endorsement, and a plurality of endorsers may acquire a plurality of maximum block heights during endorsements.

It should be understood that the foregoing describes only an example of the process in which the endorser of the transaction C1 endorses the transaction C1, and does not limit a quantity of endorsers of the transaction C1. When the endorser 102 and the endorser 103 endorse the transaction C1, another node may also endorse the transaction C1. A specific endorsement process is similar to the endorsement process of the endorser 102. Details are not listed herein one by one.

The client node 101 may receive endorsement results sent by a plurality of endorsers for the transaction C1. In this way, the client node 101 may receive a plurality of endorsement results for the transaction C1. The plurality of endorsement results one-to-one correspond to the plurality of endorsers. The client node 101 may construct transaction data based on the plurality of endorsement results.

In an embodiment, the client node 101 may first validate whether read-write sets in the plurality of endorsement results are the same. If they are the same, that is, if the read-write sets in different endorsement results are the same, the client node 101 fills the read-write set of the transaction C1 in a preset field in a data structure D1 based on the preset data structure D1. For example, because it is validated that the read-write sets of the transaction C1 in the different endorsement results are the same, a read-write set may be filled in the data structure D1, and there is no need to fill the read-write set in each endorsement result in the data structure D1.

The client node 101 may fill the block height and the signature in the endorsement result in a field that has a correspondence in the data structure D1 (that is, correspondingly store or record a block height and a signature from a same endorsement result). It may be understood that the signature indicates validity of the block height. Therefore, the signature and the block height need to be correspondingly stored. For example, it may be understood that different endorsers may start to pre-execute the transaction C1 at different moments, and blockchains in the different endorsers at a same moment are not necessarily exactly consistent. Therefore, block heights in the different endorsement results may be different. A block height and a signature in each endorsement result may be correspondingly filled in the data structure D1.

In this way, the client node 101 may complete construction of the transaction data of the transaction C1. In other words, constructed transaction data includes the read-write set of the transaction C1, the maximum block height (for example, the block height $S_{h1}$ during pre-execution of the endorser 102 on the transaction C1, and the block height $S_{h2}$ during pre-execution of the endorser 103 on the transaction C2) during pre-execution of the endorser on the transaction, and the signature of the endorser.

The client node 101 may send the constructed transaction data of the transaction C1 to an orderer 104 through operation 403. The orderer 104 may generate a block B1, or perform consensus-based block generation, based on transaction data that is of a plurality of transactions and that is received in a time period T2. The orderer 104 may package related information such as read-write sets that are of the plurality of transactions and that are received in the time period T2 into the block B1, that is, generate the block B1. In some embodiments, the orderer 104 may determine, according to a preset consensus algorithm, a transaction sequence number of each of the plurality of transactions received in the time period T2, and then, order the plurality of transactions based on the transaction sequence numbers. Then, the related information such as the read-write sets of the ordered transactions is packaged into the block B1, that is, the related information such as the read-write sets in the transaction data received in the time period T2 is included in the block B1. Duration of the time period T2 may be preset. A receiving moment at which the client node 101 receives the transaction data of the transaction C1 is in the time period T2. In other words, the related information such as the read-write set of the transaction C1 is included in the block B1.

In some embodiments, the transaction data of the transactions may be packaged into the block B1, that is, the read-write sets of the transactions and block heights (for example, the block height $S_{h1}$ and the block height $S_{h2}$ of the transaction C1) during endorsements corresponding to the transactions are both packaged into the block B1.

In some embodiments, the read-write sets of the transactions may be packaged into the block B1, and maximum block heights during endorsements corresponding to the transactions are not packaged into the block B1. In this way, a current data structure of the block can be adapted, and the data structure of the block does not need to be modified.

The orderer 104 may acquire a maximum block height $B_h$ of the orderer 104 during generation of the block B1. It should be understood that, usually, an orderer may also be used as the ledger node, and stores the blockchain, that is, stores the ledger. For an orderer that does not have the ledger node function, the blockchain may be acquired from the ledger node, or in other words, the ledger node may synchronize the blockchain to the orderer. For example, each time a block is added to the blockchain, the ledger node may synchronize, to the orderer, a blockchain including the block that is newly added to the blockchain. In this way, the orderer may acquire a maximum block height of the orderer based on the blockchain stored in the orderer.

The orderer 104 may send, to a ledger node 105 through operation 404, the read-write sets of the transactions included in the block B1, the block heights (for example, the block height $S_{h1}$ and the block height $S_{h2}$ of the transaction C1) during endorsements corresponding to the transactions included in the block B1, and the block height $B_h$. In some embodiments, if the block B1 includes the read-write sets of the transactions and the maximum block heights during endorsements corresponding to the transactions, in operation 404, the orderer 104 may specifically send the block B1 and the block height $B_h$ to the ledger node 105. In some embodiments, if the block B1 includes the read-write sets of the transactions, but does not include the maximum block heights during endorsements corresponding to the transactions, in operation 404, the orderer 104 may specifically send, to the ledger node 105, the block B1, the block heights (for example, the block height $S_{h1}$ and the block height $S_{h2}$ of the transaction C1) during endorsements corresponding to the transactions included in the block B1, and the block height $B_h$.

The ledger node 105 may determine, based on the block height $B_h$, a block height during endorsement corresponding to a transaction included in the block B1, and data cached by the ledger node 105, whether a read set of the transaction is modified in a time period from pre-execution of the transaction by the endorser to packaging of the transaction into the block, so that isolation validation on the transaction can be efficiently completed.

Another ledger node, for example, a ledger node 106, may independently perform isolation validation on the transaction with reference to a solution in which the ledger node 105 performs isolation validation on the transaction. Details are not described herein one by one again.

The following describes the data processing method provided in embodiments of this application by using an example in which the ledger node 105 performs isolation validation on the transaction C1.

In the data processing method provided in embodiments of this application, an essence of performing validity validation on the transaction C1 is: when the block including the transaction C1 is flushed, it is determined whether the transaction C1 is modified by a transaction in a flushed block, that is, whether the read set of the transaction C1 conflicts with a write set of the transaction in the flushed block. It is not difficult to understand that flushing time of the transaction that may modify the read set of the transaction C1 is after the endorsement of the transaction C1. Therefore, when the block including the transaction C1 is flushed, the validity validation is performed on the transaction C1. A flushed block that is flushed after the transaction C1 is endorsed needs to be found or determined, and validity of the transaction C1 is validated based on a write set in the flushed block. In other words, according to the data processing method provided in embodiments of this application, whether a transaction in a block that is added to the blockchain in a time period from the pre-execution (namely, the endorsement) of the transaction C1 by the endorser to adding of the block B1 including the transaction C1 to the blockchain modifies the read set of the transaction C1 is determined, that is, whether the read set of the transaction C1 conflicts with a write set of the transaction that is added to the blockchain in the time period is determined, to implement the isolation validation on the transaction C1. The transaction that is added to the blockchain is a transaction included in a block that is added to the blockchain.

In addition, it is not difficult to understand that when the block including the transaction C1 is flushed and the flushing is not completed yet, the flushed block that is flushed after the transaction C1 is endorsed is found or determined. Therefore, the found or determined flushed block flushed after the transaction C1 is endorsed is specifically a block flushed in the time period from the endorsement of the transaction C1 to the flushing of the block including the transaction C1.

However, the blockchain system is a distributed system without a globally unified timestamp. Therefore, it is difficult to directly use the timestamp to indicate the time period from the pre-execution of the transaction C1 by the endorser to the adding of the block B1 including the transaction C1 to the blockchain. Therefore, in embodiments of this application, the block height indicates a moment or a timestamp at which the transaction C1 is pre-executed by the endorser. The block height indicates the time period from the pre-execution of the transaction C1 by the endorser to the adding of the block B1 including the transaction C1 to the blockchain.

For a block on the blockchain, a block height is a quantity of blocks between the block and a genesis block (a first block on the blockchain) on the blockchain. The block height may be used as a number of a block on the blockchain and is used to identify the block. When a block needs to be queried, the block may be queried based on a block height of the block. A maximum block height indicates a block that is serially connected to the blockchain at the latest time, that is, the maximum block height is a block height of the block that is serially connected to the blockchain at the latest time. A value of the maximum block height is equal to a quantity of blocks serially connected on the blockchain. The maximum block height of the blockchain changes with an increase in the quantity of blocks serially connected to the blockchain. A minimum block height indicates the first block on the blockchain, namely, the genesis block. In addition, it should be noted that, usually, in a blockchain system, the minimum block height is 0 instead of 1. In other words, the block height is counted from 0.

With reference to the foregoing descriptions, it is not difficult to understand that for a same blockchain, a block height of a block indicates flushing time of the block, and different blocks have different flushing time and different block heights. In other words, for a same blockchain, a block height may be understood as or indicate a specific moment, and a maximum block height of the blockchain indicates a current moment. Each time a block is flushed, the maximum block height changes accordingly, which is equivalent to time moving forward. In other words, a change of the maximum block height may indicate a change of the time. Therefore, the maximum block height of the blockchain system during endorsement of the transaction C1 may indicate time at which the transaction C1 is endorsed, that is, indicate time at which the read set of the transaction C1 is read.

In addition, each of block heights corresponding to a plurality of flushed blocks indicates time at which a corresponding block is flushed. If the maximum block height of the blockchain system corresponding to the case in which the transaction C1 is endorsed falls within a range of the block heights corresponding to the plurality of flushed blocks, it indicates that the block flushed after the transaction C1 is endorsed is included in the plurality of flushed blocks. In this way, the validity of the transaction C1 may be obtained based on a write set of a transaction in the plurality of flushed blocks.

$S_h$ may indicate the maximum block height during pre-execution of the transaction C1 by the endorser, and $S_h$ may be a value in the block height $S_{h1}$ and the block height $S_{h2}$. In some embodiments, $S_h$ is a minimum value in maximum block heights corresponding to all endorsements performed on the transaction C1. If the block height $S_{h1}$ and the block height $S_{h2}$ are set to the maximum block heights corresponding to all the endorsements performed on the transaction C1, $S_h$ may be specifically a minimum value in the block height $S_{h1}$ and the block height $S_{h2}$.

It may be understood that $S_h$ is the maximum block height when the transaction C1 is pre-executed by the endorser, $B_h$ is the maximum block height when the block B1 including the read-write set of the transaction C1 is generated, and $S_h$ is less than $B_h$. If the read set of the transaction C1 is modified by a transaction C2 that is added to the blockchain, a block height of a block in which the transaction C2 modifying the read set of the transaction C1 is located in an interval $[S_h, B_h]$.

Figure 5:
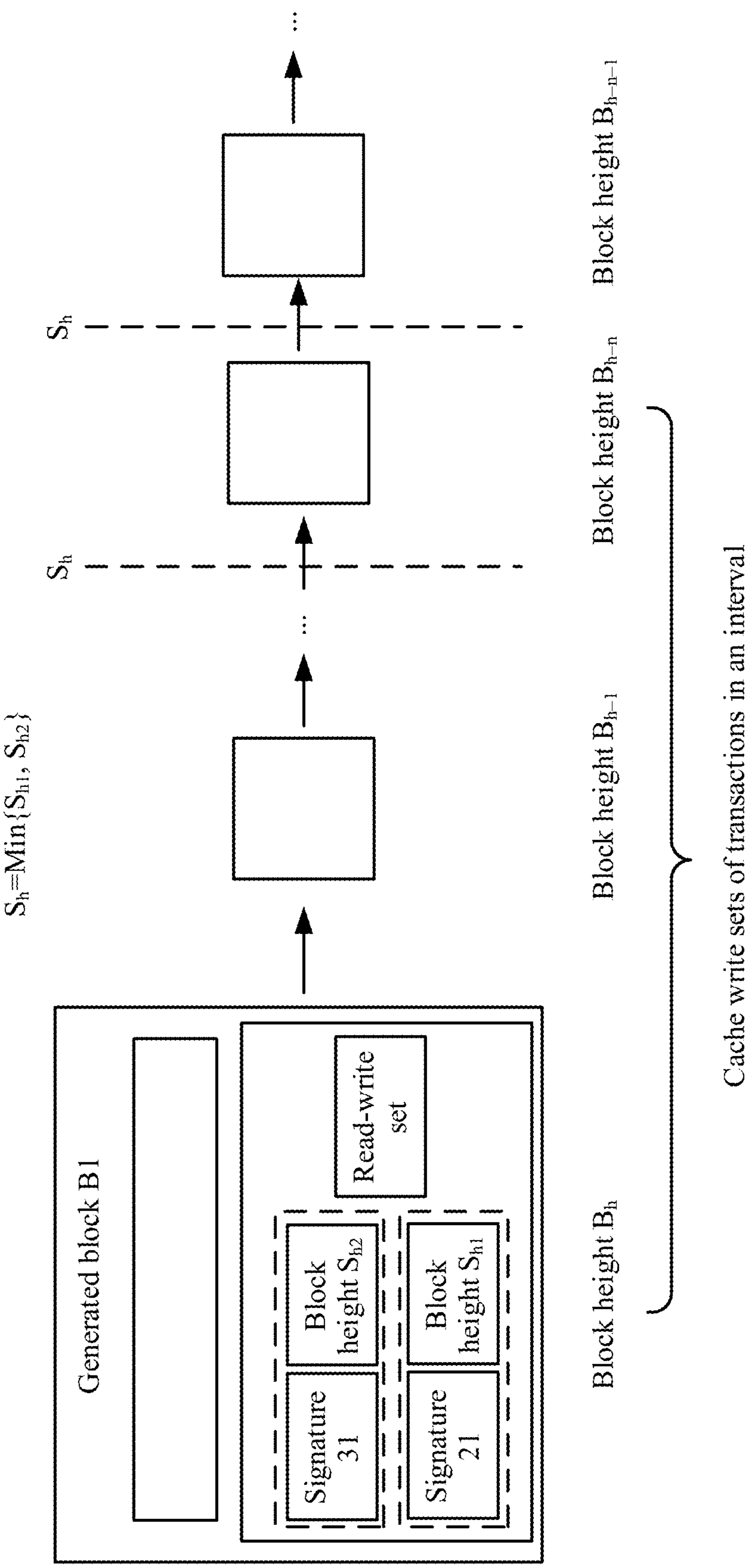
FIG. 5 is a diagram of a block in which a transaction that may modify a read set of a transaction in a block to be added to a blockchain is located according to an embodiment of this application.

Referring to FIG. 5, the ledger node 105 may cache n blocks that are added to the blockchain and whose block height interval is $[B_h-n+1, B_h]$ and block heights corresponding to the n blocks that are added to the blockchain, where n is an integer greater than or equal to 1, and n may be a preset value. A developer may freely set a value of n based on performance of the ledger node. Cached data is data recorded in a memory, that is, the data is still recorded in the memory. In addition, before the block B1 is added to the blockchain or serially connected to the blockchain, the isolation validation needs to be performed on the transaction in the block B1. Therefore, the maximum block height $B_h$ during consensus-based block generation performed by the orderer 104 on the block B1 remains unchanged in a time period from consensus-based block generation on the block B1 to the isolation validation on the block B1. When the isolation validation on the block B1 succeeds and the block B1 is serially connected to the blockchain, the maximum block height $B_h$ is updated. In this way, in the time period from the consensus-based block generation on the block B1 to the isolation validation on the block B1, the n blocks that are added to the blockchain and whose block height interval is $[B_h-n+1, B_h]$ and that are cached by the ledger node 105 are n blocks that are recently added to the blockchain relative to a block generation moment of a block to be added to the blockchain.

In embodiments of this application, the isolation validation on a transaction includes validating whether a read set of the transaction conflicts with a write set of a transaction that is added to the blockchain.

The block that is added to the blockchain may also be referred to as the flushed block.

In some embodiments, refer to FIG. 5. To reduce memory overheads, only write sets of transactions in the n blocks that are added to the blockchain may be cached.

Based on the foregoing descriptions, a solution procedure of embodiments of this application is as follows.

Figure 6:
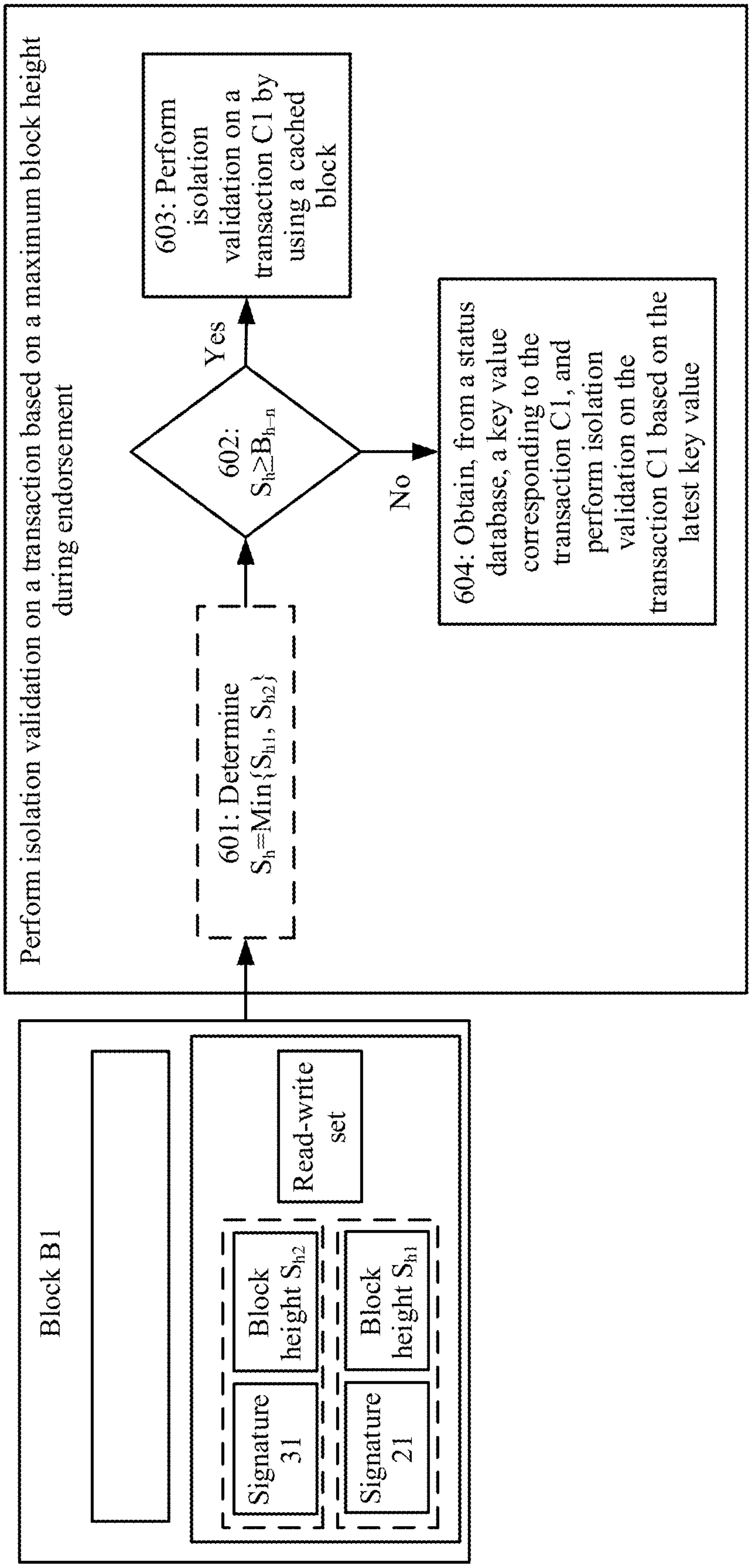
FIG. 6 is a flowchart of an isolation validation solution according to an embodiment of this application.

Referring to FIG. 6, the ledger node 105 may perform operation 602, to determine whether the block height $S_h$ is greater than or equal to $B_h-n+1$. If $S_h$ is greater than or equal to $B_h-n+1$, it indicates that the interval $[S_h, B_h]$ is included in the interval $[B_h-n+1, B_h]$. Therefore, if the transaction C2 that modifies the read set of the transaction C1 exists, the block height of the block in which the transaction C2 is located is in the interval [$B_h$−n+1, $B_h$]. Related data (for example, a write set) of a block whose block height is in the interval [$B_h$−n+1, $B_h$] is still recorded in the cache of the ledger node 105. In this way, based on the write set of the transaction in the block in the cache, whether the read set of transaction C1 conflicts with the write set of the transaction that is added to the blockchain is validated.

In an embodiment, a write set of a transaction in a block whose block height is in the interval [$S_h$, $B_h$] may be used to validate whether the read set of the transaction C1 conflicts with the write set of the transaction that is added to the blockchain.

A value of a key of the read set of the transaction C1 may be searched for in the write set included in the block whose block height is in the interval [$S_h$, $B_h$]. When the key of the read set of the transaction C1 is found in the block whose block height is in the interval [$S_h$, $B_h$], and a value of the found key is inconsistent with the key value of the read set of the transaction C1, it may be determined that the key value of the read set of the transaction C1 is modified. The isolation validation on the transaction C1 fails, that is, the transaction C1 is invalid. In an example, for an invalid transaction, a marker bit may be modified to mark the transaction as invalid.

In addition, as described above, the block B1 is generated by packaging the ordered transactions. In an ordered transaction sequence, if a read set key of a postorder transaction is consistent with a write set key of a preorder transaction, that is, an account in a read set of the postorder transaction is the same as an account in a write set of the preorder transaction, there is a dependency relationship between the two transactions, and the read set of the postorder transaction depends on the write set of the preorder transaction. For ease of description, that "the read set of the postorder transaction depends on the write set of the preorder transaction" may be referred to as that "the postorder transaction depends on the preorder transaction" for short.

In some embodiments, if the key of the read set of the transaction C1 is not found in the write set included in the block in the interval [$S_h$, $B_h$], or the key is found, and a value of the found key is consistent with the key value of the read set of the transaction C1, in this case, if the read set of the transaction C1 does not depend on a write set of another transaction in the block B1, it may be determined that isolation validation on the transaction C1 succeeds, that is, the transaction C1 is valid. If the read set of the transaction C1 depends on the write set of the another transaction in the block B1, that is, there is a transaction that has the dependency relationship with the transaction C1 in the block B1, and the transaction C1 is the postorder transaction in the transactions that have the dependency relationship, when the transaction on which the transaction C1 depends is the valid transaction, the transaction C1 is determined as the invalid transaction; or when the transaction on which the transaction C1 depends is the invalid transaction, the transaction C1 may be determined as the valid transaction. In other words, for two transactions that have the dependency relationship, when the preorder transaction is valid, the postorder transaction is definitely invalid; or when the preorder transaction is invalid, the postorder transaction is valid in a case in which the postorder transaction does not conflict with the transaction that is added to the blockchain.

Still referring to FIG. 6, in some embodiments, before operation 602 is performed, operation 601 may be first performed, to determine the minimum value in the maximum block heights corresponding to all the endorsements performed on the transaction C1. If the block height $S_{h1}$ and the block height $S_{h2}$ are set to the maximum block heights corresponding to all the endorsements performed on the transaction C1, $S_h$ may be specifically the minimum value in the block height $S_{h1}$ and the block height $S_{h2}$.

The minimum value in the maximum block heights corresponding to all the endorsements performed on the transaction C1 is used to determine the block used to validate whether the read set of the transaction C1 conflicts with the write set of the transaction that is added to the blockchain, so that an incorrect validation result caused by malicious behavior or falsification of some endorsers can be avoided. In an embodiment, as long as the at least one endorser of the transaction C1 does not have the malicious behavior or perform falsification, that is, a maximum block height during endorsement of the at least one endorser is correct, the maximum block height during correct endorsement is the minimum value in the maximum block heights corresponding to all the endorsements, or greater than the minimum value in the maximum block heights corresponding to all the endorsements. In other words, an interval [the maximum block height during correct endorsement, $B_h$] is included in or equal to an interval [the minimum value in the maximum block heights corresponding to all the endorsements, $B_h$]. In this way, when $S_h$ is greater than or equal to $B_h$−n+1, if the transaction C2 that modifies the read set of the transaction C1 exists, the block height of the block in which the transaction C2 is located is in the interval [the minimum value in the maximum block heights corresponding to all the endorsements, $B_h$].

From another perspective, if the minimum value in the maximum block heights corresponding to all the endorsements performed on the transaction C1 is not selected, but any block height $S_{hx}$ in the maximum block heights corresponding to all the endorsements performed on the transaction C1 is selected, to determine the block used to validate whether the read set of the transaction C1 conflicts with the transaction that is added to the blockchain, the following case may occur:

The selected block height $S_{hx}$ is a falsified block height, and is greater than a maximum block height during another endorsement. In this case, a determined interval [$S_{hx}$, $B_h$] cannot completely cover a block that is added to be blockchain after the pre-execution of the transaction C1 by the endorser and before the consensus-based block generation on the block B1. As a result, the block used to validate the transaction C1 is omitted. When the transaction C2 that modifies the transaction C1 is included in the omitted block, an isolation validation result of the transaction C1 is incorrect.

In some embodiments, still referring to FIG. 6, if $S_h$ is less than $B_h$−n+1, it indicates that the interval [$S_h$, $B_h$] is not included in the interval [$B_h$−n+1, $B_h$]. If the transaction C2 that modifies the read set of the transaction C1 exists, the block height of the block in which the transaction C2 is located is not necessarily in the interval [$B_h$−n+1, $B_h$]. In this way, the ledger node 105 may perform operation 604, to acquire the key value of the key of the read set of the transaction C1 from a status database, and validate, based on the key value, whether the read set of the transaction C1 conflicts with the write set of the transaction that is added to the blockchain. When the key value that corresponds to the transaction C1 and that is acquired from the status database is consistent with the read set of the transaction C1, the read set of the transaction C1 is not modified by the transaction that is added to the blockchain, that is, the read set of the transaction C1 does not conflict with the transaction that is added to the blockchain. Otherwise, the transaction C1 is invalid.

In some embodiments, the block B1 may include a plurality of transactions including the transaction C1. Isolation on at least two of the plurality of transactions can be simultaneously validated. In other words, isolation of another transaction in the block B1 may be further validated while the isolation of the transaction C1 is validated. In an example, isolation of all transactions in the block B1 may be simultaneously validated. Isolation validation solutions for different transactions may be the same or may be different.

In some embodiments, the solution shown in FIG. 6 may be used to simultaneously validate isolation of the plurality of transactions. In other words, when the solution shown in FIG. 6 is used to validate the transaction C1, the isolation of the another transaction is validated by using the solution shown in FIG. 6.

For example, the block B1 may further include related data of a transaction C3, that is, include the transaction C3. The n blocks that are added to the blockchain and that are in the cache of the ledger node 105 may not only be used to validate whether the read set of the transaction C1 conflicts with the write set of the transaction that is added to the blockchain, but further be used to validate whether the read set of the transaction C3 conflicts with the write set of the transaction that is added to the blockchain.

In some embodiments, when the n blocks that are added to the blockchain are used to validate whether the read set of the transaction C1 conflicts with the write set of the transaction that is added to the blockchain, the n blocks that are added to the blockchain may further be used to validate whether the read set of the transaction C3 conflicts with the write set of the transaction that is added to the blockchain. In this way, isolation validation on the plurality of transactions can be concurrently executed, duration occupied by the isolation validation on the block B1 can be reduced, and isolation validation efficiency can be improved. A blockchain node is usually deployed on a service node with high computing performance. Concurrent execution of the isolation validation on the plurality of transactions can make full use of hardware computing resources of the service node, improve a throughput of the service node, and meet a large-scale and high-concurrency service scenario.

In some embodiments, when the solution shown in FIG. 6 is used to validate the isolation of the transaction C1, another isolation validation solution may be used to validate isolation of another transaction (for example, the transaction C3). For example, when the isolation of the transaction C1 is validated by using the solution shown in FIG. 6, a key value of a key corresponding to the read set of the transaction C3 may be acquired from the status database, and the isolation of the transaction C3 is validated based on the acquired key value. For details, refer to the foregoing descriptions of the embodiment shown in FIG. 3.

In some embodiments, the key value of the key corresponding to the read set of the transaction C1 may be acquired from the status database, and the isolation of the transaction C1 is validated based on the acquired key value. At the same time, the key value of the key corresponding to the read set of the transaction C3 is acquired from the status database, and the isolation of the transaction C3 is validated based on the acquired key value.

In the solution in which the isolation of the plurality of transactions is simultaneously validated in embodiments of this application, a specific manner of validating isolation of each transaction is not limited.

In addition, still referring to FIG. 6, for ease of description, operation 601, operation 602, operation 603, and operation 604 may be collectively referred to as: validating, based on the maximum block height during endorsement of the transaction to be added to the blockchain, whether the read set of the transaction to be added to the blockchain conflicts with the write set of the transaction that is added to the blockchain.

In embodiments of this application, the isolation validation on a transaction further includes validating whether a read set of the transaction depends on a write set of another transaction in a block in which the transaction is located, that is, validating whether a read set of a transaction conflicts with a write set of another transaction in a same block.

Next, in different embodiments, a procedure relationship of validating whether the read set of the transaction to be added to the blockchain conflicts with the write set of the transaction that is added to the blockchain and validating whether the read set of the transaction conflicts with the write set of the another transaction in the same block is described by using an example.

Embodiment 1

It may be set that a block B1 includes related data (for example, a read set) of a transaction C1, related data (for example, a read set) of a transaction C3, and related data (for example, a read set) of a transaction C4.

Figure 7A:
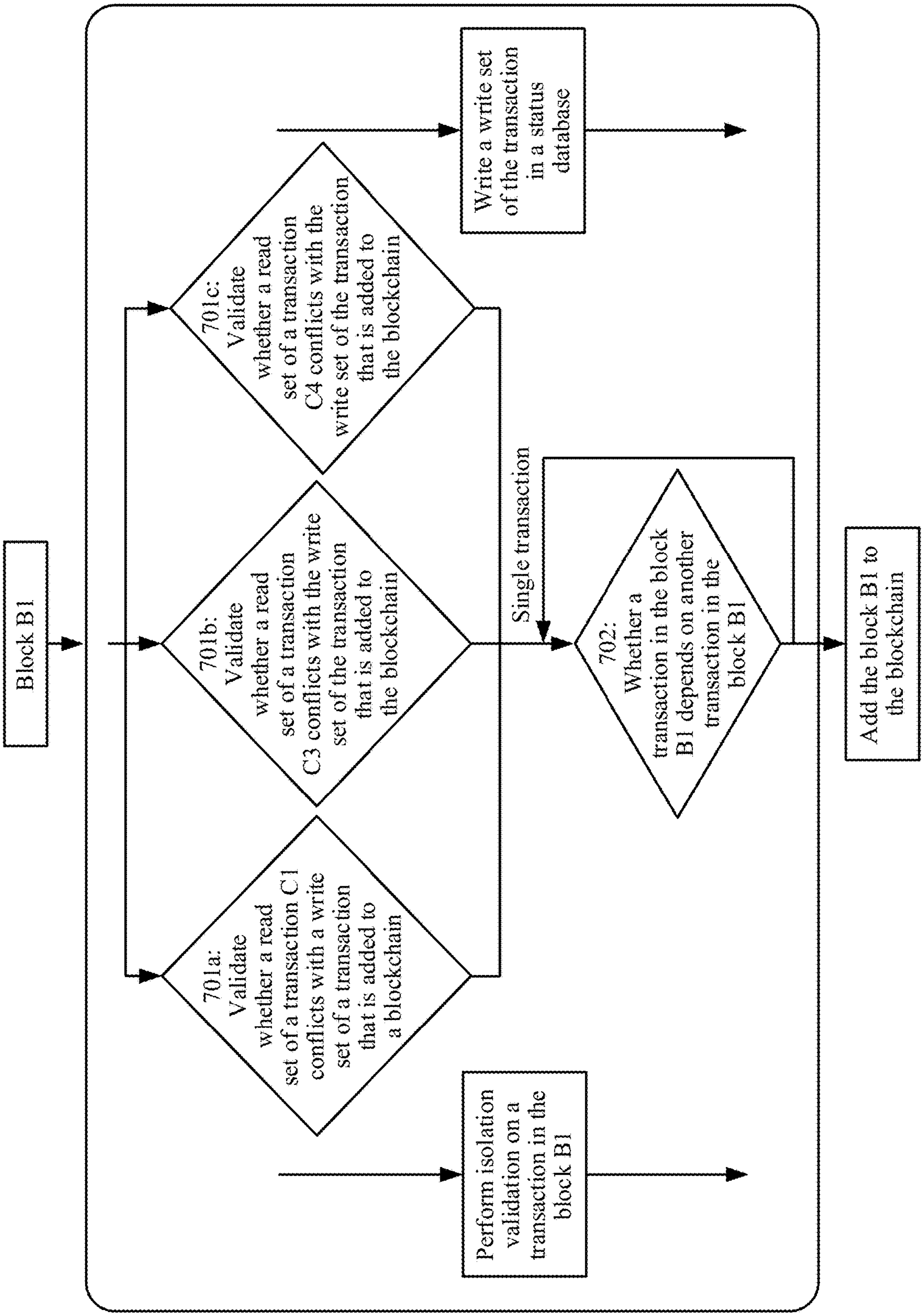
FIG. 7A is a flowchart of an isolation validation solution according to an embodiment of this application.

As shown in FIG. 7A, in a process of performing isolation validation on the block B1, operations 701*a*, 701*b*, and 701*c* may be performed, that is, based on a maximum block height during endorsement of the transaction C1, whether the read set of the transaction C1 conflicts with a write set of a transaction that is added to a blockchain is validated; based on a maximum block height during endorsement of the transaction C3, whether the read set of the transaction C3 conflicts with the write set of the transaction that is added to the blockchain is validated; and based on a maximum block height during endorsement of the transaction C4, whether the read set of the transaction C4 conflicts with the write set of the transaction that is added to the blockchain is validated. For specific execution processes of operations 701*a*, 701*b*, and 701*c*, refer to the foregoing descriptions of the embodiment shown in FIG. 6. Details are not described herein again. For example, as shown in FIG. 7A, operations 701*a*, 701*b*, and 701*c* may be concurrently performed.

In this way, read sets of transactions in the block B1 that conflict with the write set of the transaction that is added to the blockchain, and read sets of transactions in the block B1 that do not conflict with the write set of the transaction that is added to the blockchain may be determined.

The transaction whose read set conflicts with the write set of the transaction that is added to the blockchain may be determined as an invalid transaction.

For a transaction whose read set does not conflict with the write set of the transaction that is added to the blockchain, for example, the transaction C1, in operation 702, whether the transaction C1 depends on another transaction in the block B1 may be validated, that is, whether the read set of the transaction C1 depends on a write set of the another transaction in the block B1 may be validated. For the transaction C1, the another transaction is a transaction other than the transaction C1 in the block B1. For details about dependency of the read set of the transaction on the write set of the another transaction, refer to the foregoing descriptions. Details are not described herein again. In this way, the read set of the transaction that depends on the write set of the another transaction in the block B1 may be determined. Refer to the transaction C1. For each transaction that is in the block B1 and whose read set does not conflict with the write set of the transaction that is added to the blockchain, whether the transaction depends on the another transaction in the block B1 is validated.

If a read set of a transaction in the block B1 does not conflict with the write set of the transaction that is added to the blockchain, and a read set of the transaction does not depend on the write set of the another transaction in the block B1, it may be determined that isolation validation on the transaction succeeds, that is, the transaction is valid.

If a read set of a transaction in the block B1 conflicts with the write set of the transaction that is added to the blockchain, it may be determined that isolation validation on the transaction fails, that is, the transaction is invalid.

If a read set of a transaction in the block B1 does not conflict with the write set of the transaction that is added to the blockchain, but the read set of the transaction depends on the write set of the another transaction, when the transaction on which the transaction depends is valid, it is determined that the transaction is invalid.

After the isolation validation is performed on each transaction in the block B1, the block B1 may be serially connected to the blockchain, that is, the block B1 is added to the blockchain. After the block B1 is added to the blockchain, a write set of the valid transaction in the block B1 is updated to a status database of a ledger node 105, that is, a key value of a corresponding key is updated. A write set of the invalid transaction is not updated to the status database of the ledger node 105.

Figures 1, 7B:
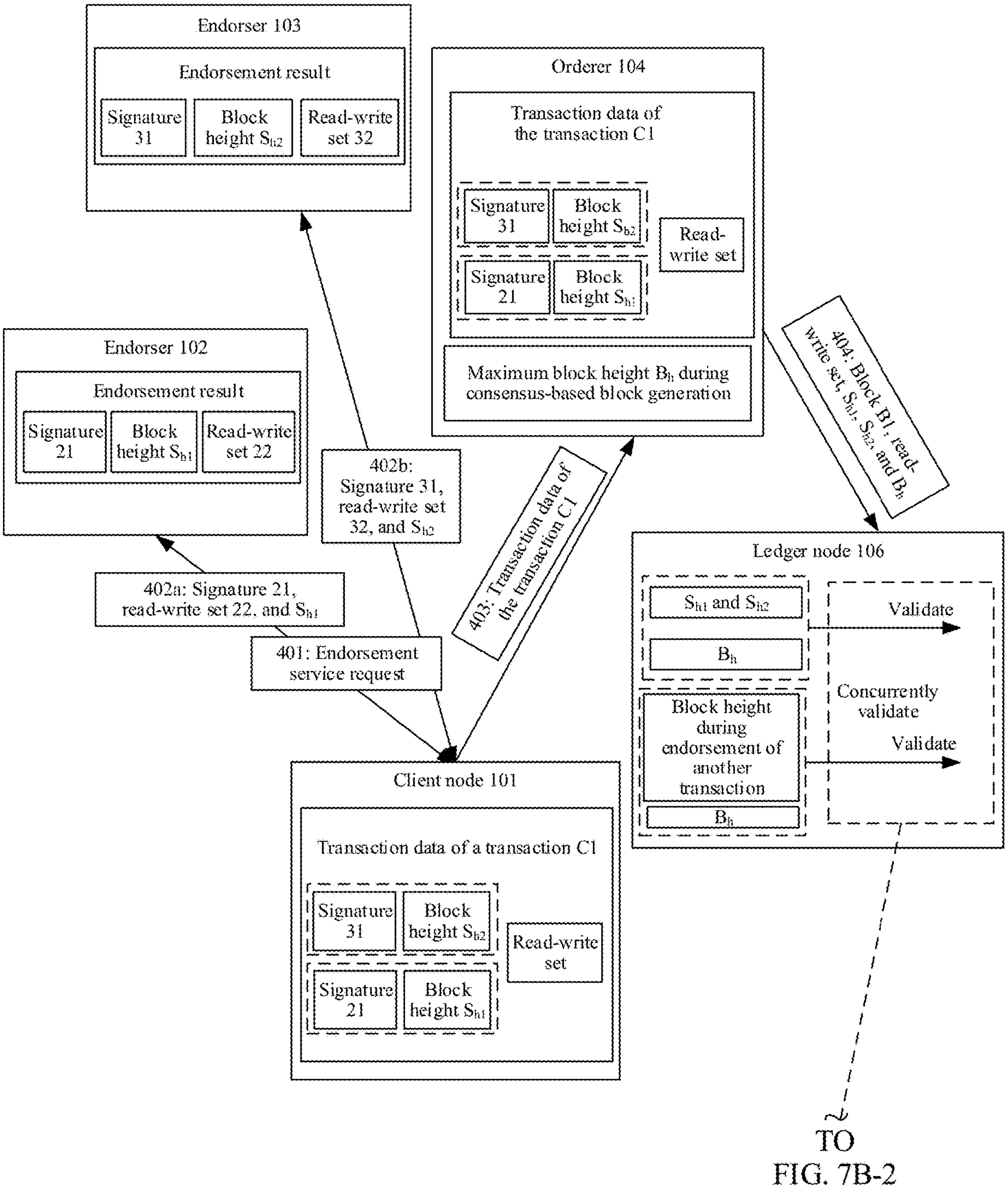
Figures 2, 7B:
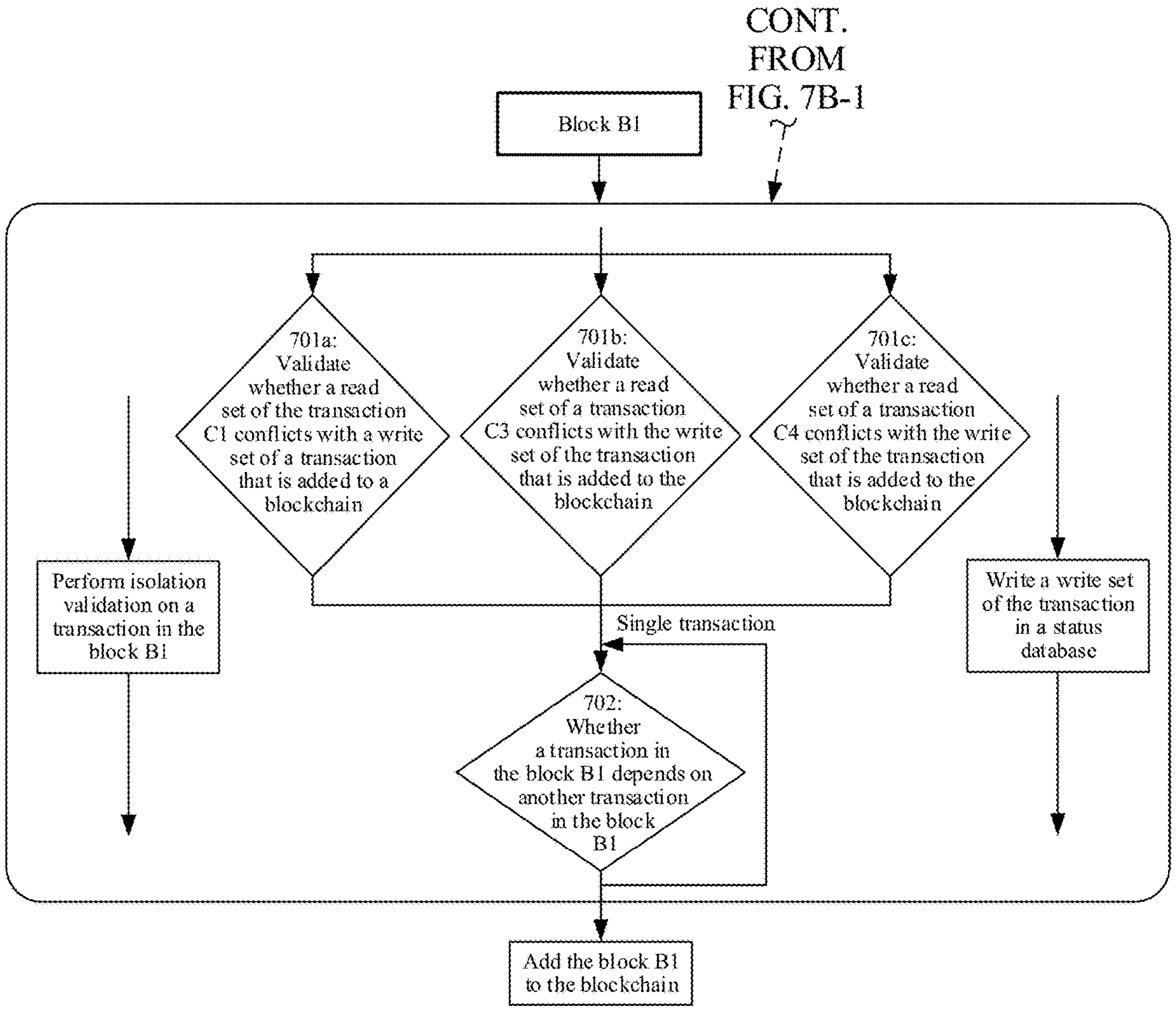

Based on the foregoing descriptions, an overall procedure of a data processing method provided in this embodiment of this application may be shown in FIG. 7B-1 and FIG. 7B-2. Specifically, the following operations may be included.

A client node 101 may perform operation 401, to send endorsement service requests to an endorser 102 and an endorser 103. For a specific embodiment process, refer to the foregoing descriptions of the embodiment shown in FIG. 4. Details are not described herein again.

The endorser 102 may send a signature 21, a read-write set 22, and a block height $S_{h1}$ to the client node 101 through 402*a*. The endorser 103 may send a signature 31, a read-write set 32, and a block height $S_{h2}$ to the client node 101 through 402*b*. For a specific embodiment process, refer to the foregoing descriptions of the embodiment shown in FIG. 4. Details are not described herein again.

The client node 101 may receive endorsement results sent by a plurality of endorsers for the transaction C1. In this way, the client node 101 may receive a plurality of endorsement results for the transaction C1. The plurality of endorsement results one-to-one correspond to the plurality of endorsers. The client node 101 may construct transaction information based on the plurality of endorsement results. For details, refer to the foregoing descriptions of the embodiment shown in FIG. 4. Details are not described herein again.

The client node 101 may send the constructed transaction data of the transaction C1 to an orderer 104 through operation 403. The orderer 104 may generate the block B1, or perform consensus-based block generation, based on transaction data that is of a plurality of transactions and that is received in a time period T2. The orderer 104 may package related information such as read-write sets that are of the plurality of transactions and that are received in the time period T2 into the block B1, that is, generate the block B1. For details, refer to the foregoing descriptions of the embodiment shown in FIG. 4. Details are not described herein again.

The orderer 104 may acquire a maximum block height $B_h$ of the orderer 104 during generation of the block B1.

The orderer 104 may send, to the ledger node 105 through operation 404, the read-write sets of the transactions included in the block B1, block heights (for example, the block height $S_{h1}$ and the block height $S_{h2}$ of the transaction C1) during endorsements corresponding to the transactions included in the block B1, and the block height $B_h$. For details, refer to the foregoing descriptions of the embodiment shown in FIG. 4. Details are not described herein again.

The ledger node 105 may determine, based on the block height $B_h$, a block height during endorsement corresponding to a transaction included in the block B1, and data cached by the ledger node 105, whether a read set of the transaction is modified in a time period from pre-execution of the transaction by the endorser to packaging of the transaction into the block, so that isolation validation on the transaction can be efficiently completed. In an embodiment, the ledger node 105 may validate, in operation 701*a*, whether the read set of the transaction C1 conflicts with the write set of the transaction that is added to the blockchain, in operation 701*b*, validate whether the read set of the transaction C3 conflicts with the write set of the transaction that is added to the blockchain, and in operation 701*c*, validate whether the read set of the transaction C4 conflicts with the write set of the transaction that is added to the blockchain. For a specific embodiment process, refer to the foregoing descriptions of the embodiment shown in FIG. 6.

Then, the ledger node 105 may perform operation 702, to validate whether a transaction in the block B1 depends on another transaction in the block B1. For details, refer to the foregoing descriptions. Details are not described herein again. Operation 702 is performed on all transactions that are in the block B1 and whose read sets do not conflict with the write set of the transaction that is added to the blockchain, that is, whether the transactions depend on the another transaction in the block B1 is validated.

In this way, valid and invalid transactions in the block B1 can be found. Then, the block B1 may be serially connected to the blockchain, that is, the block B1 is added to the blockchain. After the block B1 is added to the blockchain, the write set of the valid transaction in the block B1 is updated to the status database of the ledger node 105, that is, the key value of the corresponding key is updated. The write set of the invalid transaction is not updated to the status database of the ledger node 105.

According to the data processing method provided in this embodiment of this application, only some memory overheads and computing resources are required, so that the isolation validation on the transaction in the block to be added to the blockchain can be quickly completed. This greatly reduces duration occupied by the isolation validation, accelerates a speed of adding the block to the blockchain, and improves performance of a blockchain system. In addition, according to the data processing method provided in this embodiment of this application, impact brought by a data scale in the status database is slight, so that an insolation validation speed does not change with an increase in the data scale in the status database. This ensures performance stability of long-term running of the blockchain system. According to the data processing method provided in an embodiment of this application, the isolation validation on the transaction in the block to be added to the blockchain is performed based on the data cached in the memory. This avoids occupation of the memory by the isolation validation, reduces impact on the status database, accelerates the speed of adding the block to the blockchain, and helps the blockchain system run with high performance in a complex service scenario. In addition, according to the data processing method provided in this embodiment, the isolation of the plurality of transactions can be concurrently validated. This greatly reduces the duration required for the isolation validation on the transaction in the block to be added to the blockchain, so that the block to be added to the blockchain can be added to the blockchain as soon as possible, thereby further improving the performance of the blockchain system.

Embodiment 2

It may still be set that a block B1 includes related data (for example, a read set) of a transaction C1, related data (for example, a read set) of a transaction C3, and related data (for example, a read set) of a transaction C4.

Figure 8A:
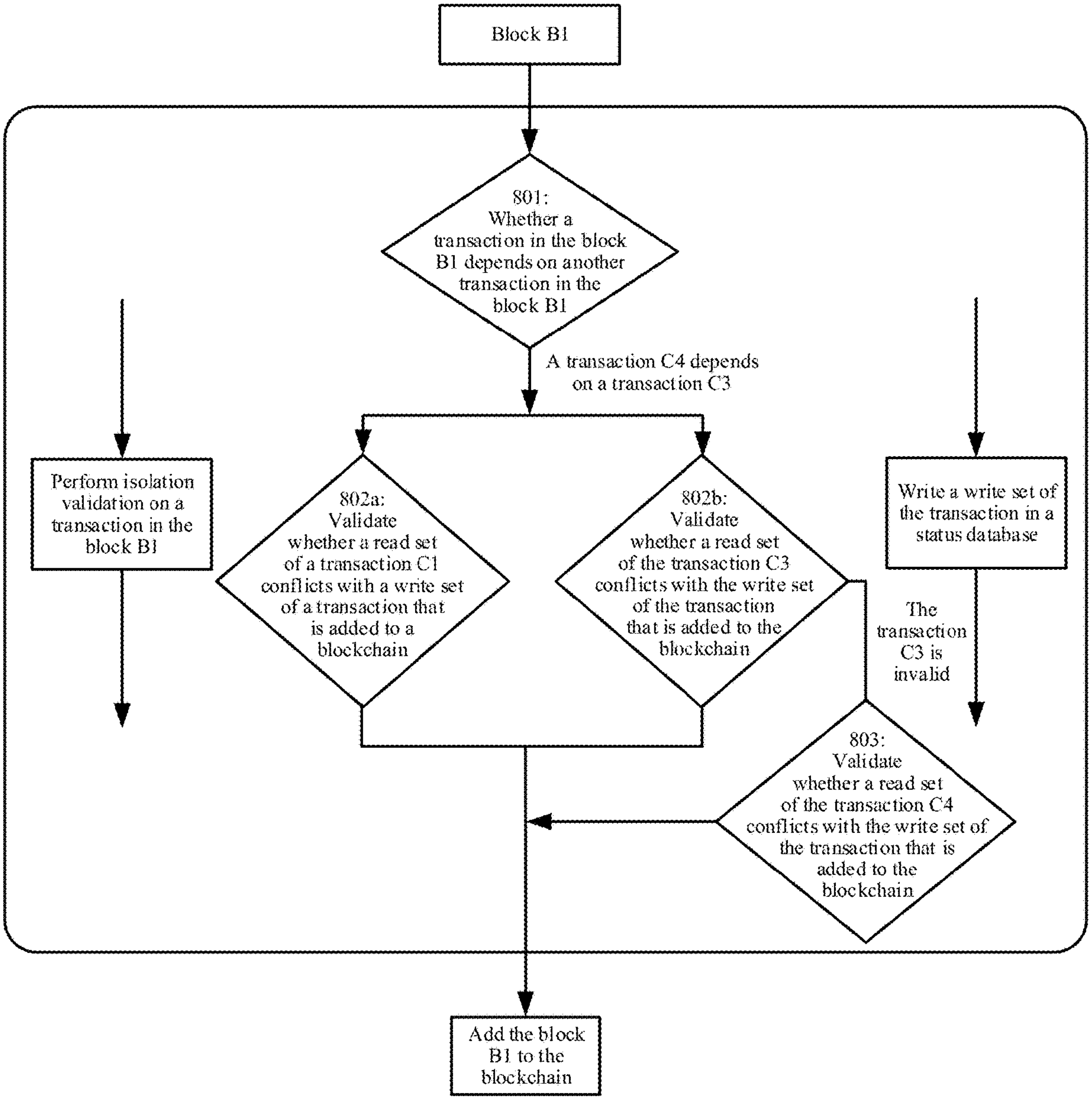
FIG. 8A is a flowchart of an isolation validation solution according to an embodiment of this application.

Referring to FIG. 8A, in a process of performing isolation validation on the block B1, operation 801 may be first performed, to validate whether each transaction depends on another transaction in the block B1. The transaction C1 is used as an example. Whether the transaction C1 depends on the another transaction in the block B1 may be validated, that is, whether the read set of the transaction C1 depends on a write set of the another transaction in the block B1 may be validated. For the transaction C1, the other transaction is a transaction other than the transaction C1 in the block B1. For details about dependency of the read set of the transaction on the write set of the another transaction, refer to the foregoing descriptions. Details are not described herein again. In this way, the read set of the transaction that depends on the write set of the another transaction in the block B1 may be determined. Referring to the transaction C1, whether each transaction in the block B1 depends on the another transaction in the block B1 is validated. In this way, the transaction that depends on the another transaction in the block B1 can be found. In this embodiment of this application, that a transaction E1 depends on another transaction E2 means that a read set of the transaction E1 depends on a write set of the transaction E2. In other words, in an ordered transaction sequence, the transaction E1 is a postorder transaction of the transaction E2, or the transaction E2 is a preorder transaction of the transaction E1. A key value of the read set of the transaction E1 is consistent with a key value of the write set of the transaction E2.

It may be set that the transaction C4 in the block B1 depends on the transaction C3 in the block B1, and the transaction C1 and the transaction C3 do not depend on the another transaction in the block B1. For the transaction C1, the other transaction is the transaction other than the transaction C1 in the block B1. For the transaction C3, the another transaction is a transaction other than the transaction C3 in the block B1.

Next, the transaction in the block B1 that does not depend on the other transaction may be first validated. For example, in operation 802*a*, based on a maximum block height during endorsement of the transaction C1, whether the read set of the transaction C1 conflicts with a write set of a transaction that is added to a blockchain is validated; and in operation 802*b*, based on a maximum block height during endorsement of the transaction C3, whether the read set of the transaction C3 conflicts with the write set of the transaction that is added to the blockchain is validated. For details about operation 802*a* and operation 802*b*, refer to the foregoing descriptions of the embodiment shown in FIG. 6. Details are not described herein again. For example, as shown in FIG. 8A, operation 802*a* and operation 802*b* may be concurrently performed.

If a read set of a transaction in the block B1 does not conflict with the write set of the transaction that is added to the blockchain, and a read set of the transaction does not depend on the write set of the another transaction in the block B1, it may be determined that isolation validation on the transaction succeeds, that is, the transaction is valid.

If a read set of a transaction in the block B1 conflicts with the write set of the transaction that is added to the blockchain, isolation validation on the transaction fails, that is, the transaction is invalid. It may be determined whether the invalid transaction is depended on by the another transaction. If the invalid transaction is depended on by the another transaction, the transaction that depends on the invalid transaction may continue to be validated. For example, as shown in FIG. 8A, the transaction C4 depends on the transaction C3, and the transaction C3 is determined as the invalid transaction. In this case, operation 803 may continue to be performed based on a maximum block height during endorsement of the transaction C4, to validate whether the read set of the transaction C4 conflicts with the write set of the transaction that is added to the blockchain. If a conflict occurs, the transaction C4 is invalid. If no conflict occurs, the transaction C4 is valid.

After the isolation validation is performed on each transaction in the block B1, the block B1 may be serially connected to the blockchain, that is, the block B1 is added to the blockchain. After the block B1 is added to the blockchain, a write set of the valid transaction in the block B1 is updated to a status database of a ledger node 105, that is, a key value of a corresponding key is updated. A write set of the invalid transaction is not updated to the status database of the ledger node 105.

Figures 1, 8B:
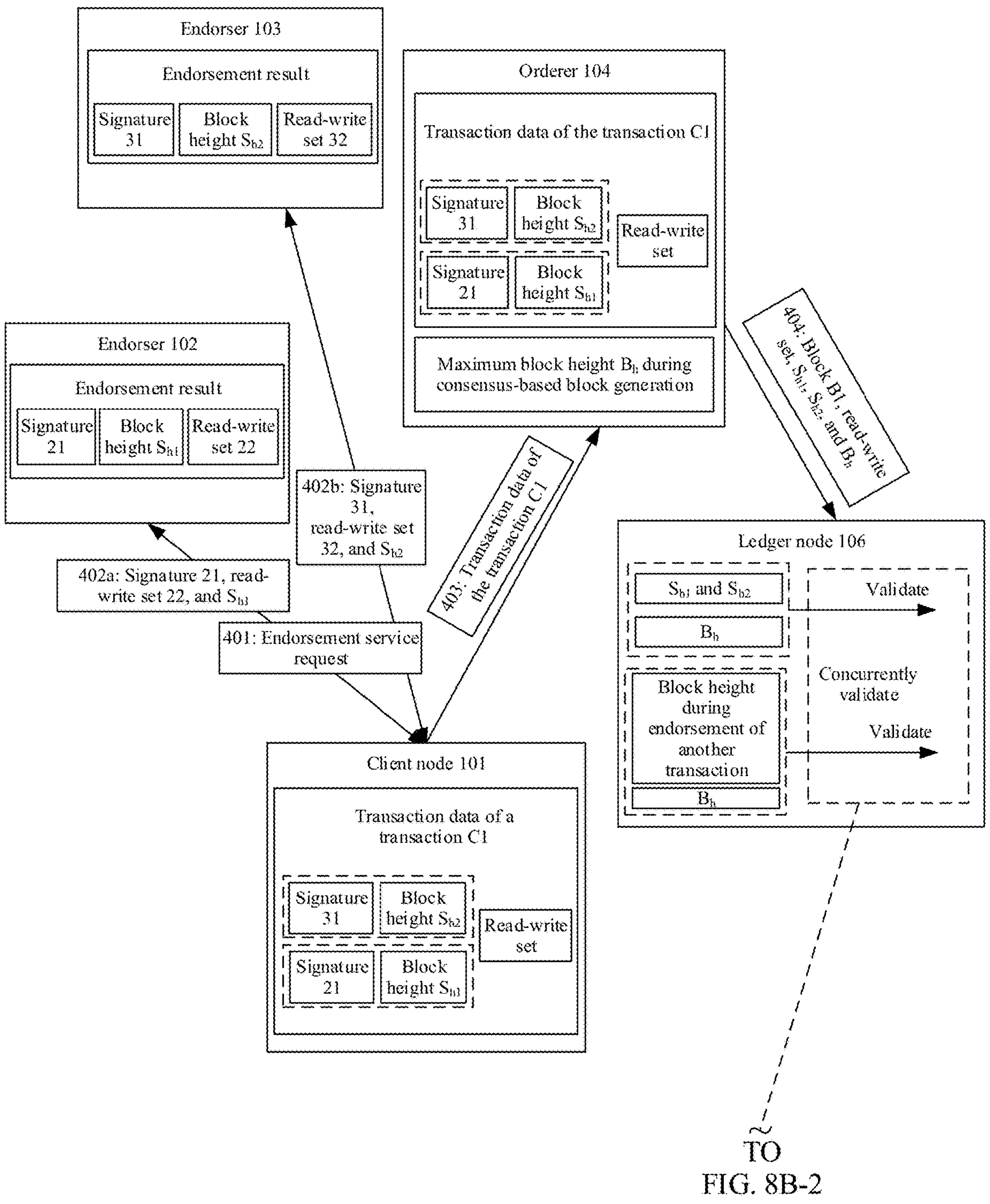

Based on the foregoing descriptions, an overall procedure of a data processing method provided in this embodiment of this application may be shown in FIG. 8B-1 and FIG. 8B-2. In an embodiment, the following operations may be included.

A client node 101 may perform operation 401, to send endorsement service requests to an endorser 102 and an endorser 103. For a specific embodiment process, refer to the foregoing descriptions of the embodiment shown in FIG. 4. Details are not described herein again.

The endorser 102 may send a signature 21, a read-write set 22, and a block height $S_{h1}$ to the client node 101 through 402*a*. The endorser 103 may send a signature 31, a read-write set 32, and a block height $S_{h2}$ to the client node 101 through 402*b*. For a specific embodiment process, refer to the foregoing descriptions of the embodiment shown in FIG. 4. Details are not described herein again.

The client node 101 may receive endorsement results sent by a plurality of endorsers for the transaction C1. In this way, the client node 101 may receive a plurality of endorsement results for the transaction C1. The plurality of endorsement results one-to-one correspond to the plurality of endorsers. The client node 101 may construct transaction information based on the plurality of endorsement results. For details, refer to the foregoing descriptions of the embodiment shown in FIG. 4. Details are not described herein again.

The client node 101 may send the constructed transaction data of the transaction C1 to an orderer 104 through operation 403. The orderer 104 may generate the block B1, or perform consensus-based block generation, based on transaction data that is of a plurality of transactions and that is received in a time period T2. The orderer 104 may package information such as read-write sets that are of the plurality of transactions and that are received in the time period T2 into the block B1, to generate the block B1. For details, refer to the foregoing descriptions of the embodiment shown in FIG. 4. Details are not described herein again.

The orderer 104 may acquire a maximum block height $B_h$ of the orderer 104 during generation of the block B1.

The orderer 104 may send, to the ledger node 105 through operation 404, the read-write sets of the transactions included in the block B1, block heights (for example, the block height $S_{h1}$ and the block height $S_{h2}$ of the transaction C1) during endorsements corresponding to the transactions included in the block B1, and the block height $B_h$. For details, refer to the foregoing descriptions of the embodiment shown in FIG. 4. Details are not described herein again.

The ledger node 105 may determine, based on the block height $B_h$, a block height during endorsement corresponding to a transaction included in the block B1, and data cached by the ledger node 105, whether a read set of the transaction is modified in a time period from pre-execution of the transaction by the endorser to packaging of the transaction into the block, so that isolation validation on the transaction can be efficiently completed. Specifically, as shown in FIG. 8B-1 and FIG. 8B-2, the ledger node 105 may perform operation 801, to validate whether a transaction in the block B1 depends on another transaction in the block B1. For details, refer to the foregoing descriptions. Details are not described herein again. Operation 801 is performed on each transaction in the block B1, that is, whether the transaction depends on the another transaction in the block B1 is validated.

Figures 2, 8B:
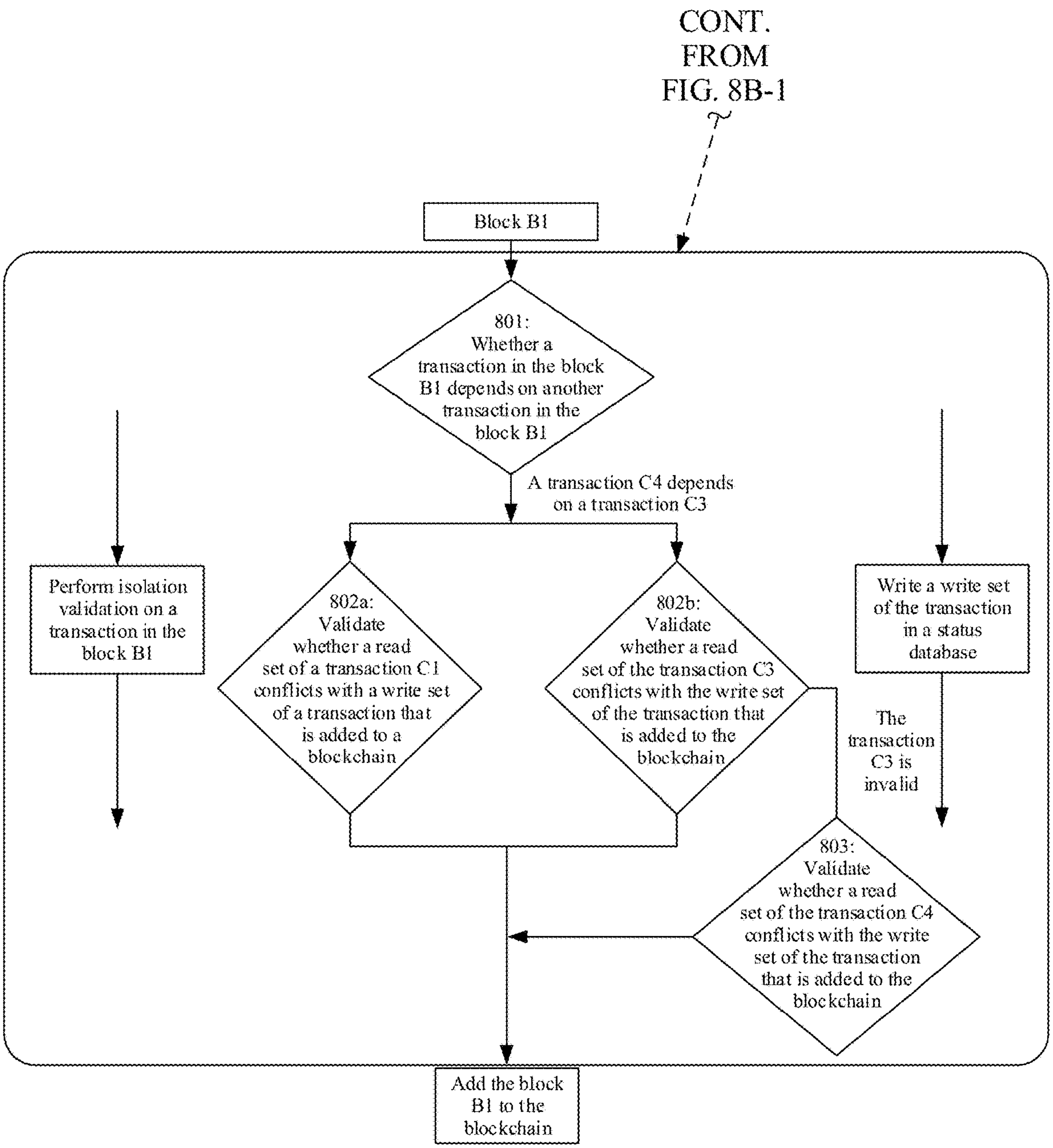

For a transaction that does not depend on another transaction in the same block, it may be further validated whether a read set conflicts with the write set of the transaction that is added to the blockchain. In an embodiment, as shown in FIG. 8, the ledger node 105 may further validate, in operation 802*a*, whether the read set of the transaction C1 conflicts with the write set of the transaction that is added to the blockchain, and further validate, in operation 802*b*, whether the read set of the transaction C3 conflicts with the write set of the transaction that is added to the blockchain. For the details about operation 802*a* and operation 802*b*, refer to the foregoing descriptions of the embodiment shown in FIG. 6. Details are not described herein again. For example, as shown in FIG. 8A, operation 802*a* and operation 802*b* may be concurrently performed.

In this way, valid and invalid transactions in the block B1 can be found. Then, the block B1 may be serially connected to the blockchain, that is, the block B1 is added to the blockchain. After the block B1 is added to the blockchain, the write set of the valid transaction in the block B1 is updated to the status database of the ledger node 105, that is, the key value of the corresponding key is updated. The write set of the invalid transaction is not updated to the status database of the ledger node 105.

According to the data processing method provided in an embodiment of this application, only some memory overheads and computing resources are required, so that the isolation validation on the transaction in the block to be added to the blockchain can be quickly completed. This greatly reduces duration occupied by the isolation validation, accelerates a speed of adding the block to the blockchain, and improves performance of a blockchain system. In addition, according to the data processing method provided in this embodiment of this application, impact brought by a data scale in the status database is slight, so that an insolation validation speed does not change with an increase in the data scale in the status database. This ensures performance stability of long-term running of the blockchain system. According to the data processing method provided in an embodiment of this application, the isolation validation on the transaction in the block to be added to the blockchain is performed based on the data cached in the memory. This avoids occupation of the memory by the isolation validation, reduces impact on the status database, accelerates the speed of adding the block to the blockchain, and helps the blockchain system run with high performance in a complex service scenario. In addition, according to the data processing method provided in this embodiment, the isolation of the plurality of transactions can be concurrently validated. This greatly reduces the duration required for the isolation validation on the transaction in the block to be added to the blockchain, so that the block to be added to the blockchain can be added to the blockchain as soon as possible, thereby further improving the performance of the blockchain system.

Embodiment 3

Figure 9:
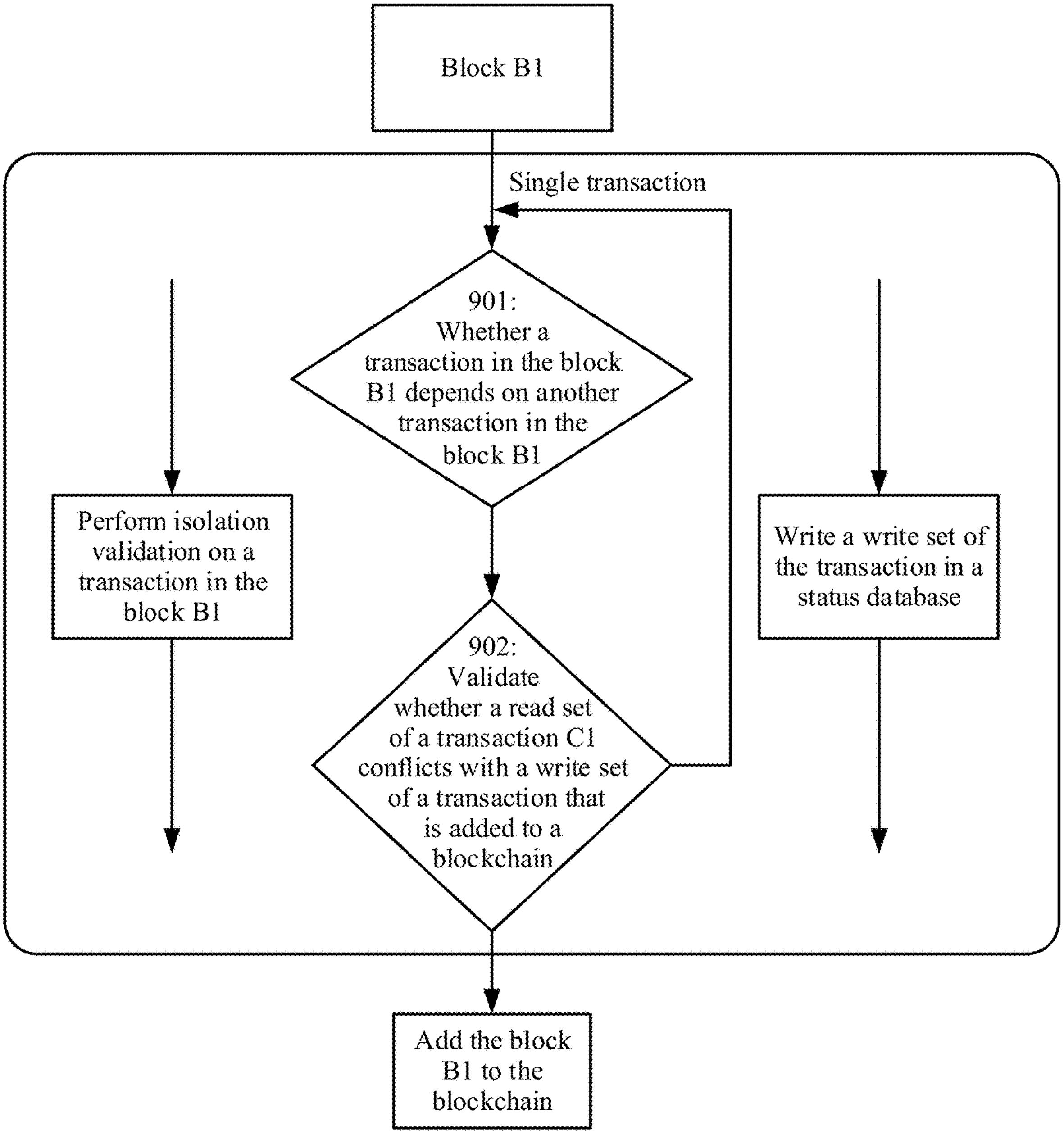
FIG. 9 is a flowchart of a data processing method according to an embodiment of this application.

Referring to FIG. 9, an overall procedure of a data processing method provided in an embodiment of this application may alternatively be shown in FIG. 9.

Referring to FIG. 9, in a process of performing isolation validation on a block B1, operation 901 may be first performed, to validate whether a transaction depends on another transaction in the block B1. A transaction C1 is used as an example. Whether the transaction C1 depends on another transaction in the block B1 may be validated, that is, whether a read set of the transaction C1 depends on a write set of the another transaction in the block B1 may be validated. For the transaction C1, the other transaction is a transaction other than the transaction C1 in the block B1. For details about dependency of the read set of the transaction on the write set of the another transaction, refer to the foregoing descriptions. Details are not described herein again. Operation 901 is performed on each transaction in the block B1, that is, whether the transaction depends on the another transaction in the block B1 is validated. In this way, it may be determined that the read set of the transaction C1 depends on the write set of the another transaction in the block B1.

When the transaction C1 does not depend on the another transaction in the block B1, operation 902 may be performed, to validate, based on a maximum block height during endorsement of the transaction C1, whether the read set of the transaction C1 conflicts with a write set of a transaction that is added to a blockchain. For details, refer to the foregoing descriptions of the embodiment shown in FIG. 6.

When the transaction C1 depends on the another transaction in the block B1, for example, a transaction C3, validity of the transaction C3 may be first validated. If the transaction C3 is valid, it is determined that the transaction C1 is an invalid transaction. If the transaction C3 is invalid, operation 902 is performed. If the read set of the transaction C1 does not conflict with the write set of the transaction that is added to the blockchain, the transaction C1 is valid. Otherwise, the transaction C1 is invalid.

In this way, the isolation validation on the transaction C1 can be completed.

The isolation validation may be sequentially performed on other transactions in the block B1 with reference to a manner in which the isolation validation is performed on the transaction C1.

In this way, valid and invalid transactions in the block B1 can be found. Then, the block B1 may be serially connected to the blockchain, that is, the block B1 is added to the blockchain. After the block B1 is added to the blockchain, a write set of the valid transaction in the block B1 is updated to a status database of a ledger node 105, that is, a key value of a corresponding key is updated. A write set of the invalid transaction is not updated to the status database of the ledger node 105.

According to the data processing method provided in an embodiment of this application, only some memory overheads and computing resources are required, so that the isolation validation on the transaction in the block to be added to the blockchain can be quickly completed. This greatly reduces duration occupied by the isolation validation, accelerates a speed of adding the block to the blockchain, and improves performance of a blockchain system. In addition, according to the data processing method provided in this embodiment of this application, impact brought by a data scale in the status database is slight, so that an insolation validation speed does not change with an increase in the data scale in the status database. This ensures performance stability of long-term running of the blockchain system. According to the data processing method provided in this embodiment of this application, the isolation validation on the transaction in the block to be added to the blockchain is performed based on the data cached in the memory. This avoids occupation of the memory by the isolation validation, reduces impact on the status database, accelerates the speed of adding the block to the blockchain, and helps the blockchain system run with high performance in a complex service scenario.

Based on the foregoing data processing solution, an embodiment of this application provides a data processing method that can be applied to a first node in a blockchain system. The method is another expression of the foregoing solution, and the two are combined. The first node may be a ledger node in the blockchain system.

Figure 10:
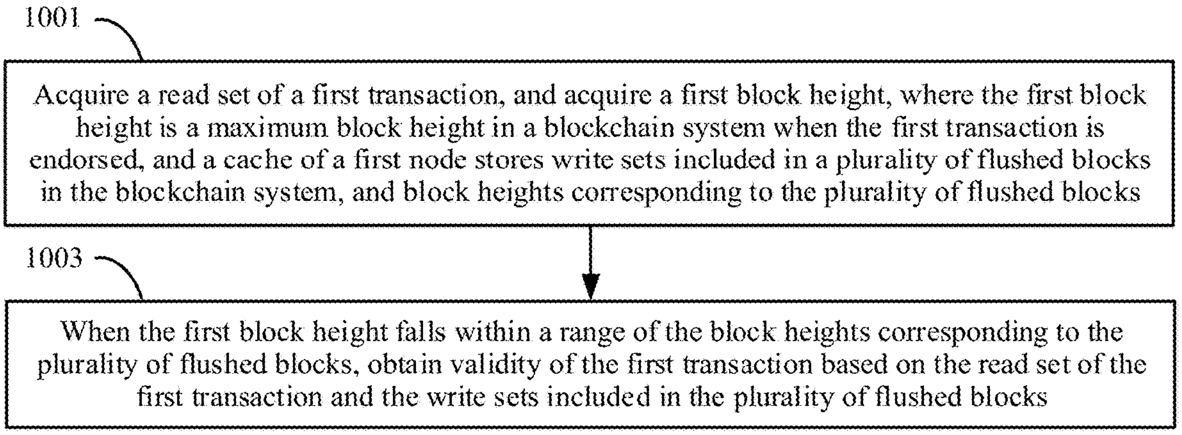
FIG. 10 is a flowchart of a data processing method according to an embodiment of this application.

As shown in FIG. 10, the method includes the following operations:

operation 1001: acquiring a read set of a first transaction, and acquiring a first block height, where the first block height is a maximum block height in the blockchain system when the first transaction is endorsed, and a cache of the first node stores write sets included in a plurality of flushed blocks in the blockchain system and block heights corresponding to the plurality of flushed blocks; and operation 1003: when the first block height falls within a range of the block heights corresponding to the plurality of flushed blocks, obtaining validity of the first transaction based on the read set of the first transaction and the write sets included in the plurality of flushed blocks.

In some embodiments, the block heights corresponding to the plurality of flushed blocks belong to an interval $[B_h-n+1, B_h]$, and when the first block height is greater than or equal to $B_h-n+1$, the first block height falls within the range of the block heights corresponding to the plurality of flushed blocks, where n is an integer greater than or equal to 1, and $B_h$ is an integer greater than or equal to 0.

In some embodiments, $B_h$ is a maximum block height in the blockchain system when a block to which the first transaction belongs is generated.

In some embodiments, the method further includes: when the first block height falls outside the range of the block heights corresponding to the plurality of flushed blocks, acquiring, from a status database of the first node, a first key value of a key corresponding to the read set of the first transaction; and obtaining the validity of the first transaction based on the read set of the first transaction and the first key value.

In some embodiments, the blockchain system further includes a first endorser and a second endorser that are configured to endorse the first transaction; and the acquiring a first block height includes: acquiring a second block height and a third block height, where the second block height is a maximum block height in the blockchain system when the first transaction is endorsed by the first endorser, and the third block height is a maximum block height in the blockchain system when the first transaction is endorsed by the second endorser; and using a smaller one in the second block height and the third block height as the first block height.

In some embodiments, the method further includes: acquiring a read set of a second transaction, where the first transaction and the second transaction belong to a same block; and in a process of obtaining the validity of the first transaction based on the read set of the first transaction and the write sets included in the plurality of flushed blocks, concurrently obtaining validity of the second transaction based on the read set of the second transaction.

In some embodiments, the obtaining validity of the first transaction based on the read set of the first transaction and the write sets included in the plurality of flushed blocks includes: when the read set of the first transaction conflicts with a write set of a third transaction, determining that the first transaction is invalid, where the third transaction is included in the plurality of flushed blocks.

In some embodiments, the obtaining validity of the first transaction based on the read set of the first transaction and the write sets included in the plurality of flushed blocks includes: when the read set of the first transaction does not conflict with the write sets included in the plurality of flushed blocks, obtaining the validity of the first transaction based on the read set of the first transaction and a write set of another transaction, where the another transaction is a transaction other than the first transaction in the block to which the first transaction belongs.

In some embodiments, the obtaining the validity of the first transaction based on the read set of the first transaction and a write set of another transaction includes: when the first transaction does not depend on the write set of the another transaction, determining that the first transaction is valid; or when the first transaction depends on a write set of a fourth transaction in the another transaction, but the fourth transaction is invalid, determining that the first transaction is valid; or when the first transaction depends on a write set of a fourth transaction in the another transaction, and the fourth transaction is valid, determining that the first transaction is invalid.

According to the method provided in an embodiment of this application, only some memory overheads and computing resources are required, so that isolation validation on the transaction in a block to be added to a blockchain can be quickly completed. This greatly reduces duration required for the isolation validation on the transaction in the block to be added to the blockchain, accelerates a speed of adding the block to the blockchain, and improves performance of the blockchain system. In addition, in this solution, when the isolation validation is performed on the transaction, the isolation validation is slightly affected by a data scale in the status database, so that an insolation validation speed does not change with an increase in the data scale in the status database. This ensures performance stability of long-term running of the blockchain system. In addition, in this solution, the isolation validation on the transaction in the block to be added to the blockchain is performed based on the data cached in the memory. This avoids occupation of the memory by the isolation validation on the transaction, reduces impact on the status database, accelerates the speed of adding the block to the blockchain, and helps the blockchain system run with high performance in a complex service scenario.

Based on the foregoing data processing solution, an embodiment of this application provides a data processing method that can be applied to a first node in a blockchain system. The first node may be a ledger node in the blockchain system.

Figure 11:
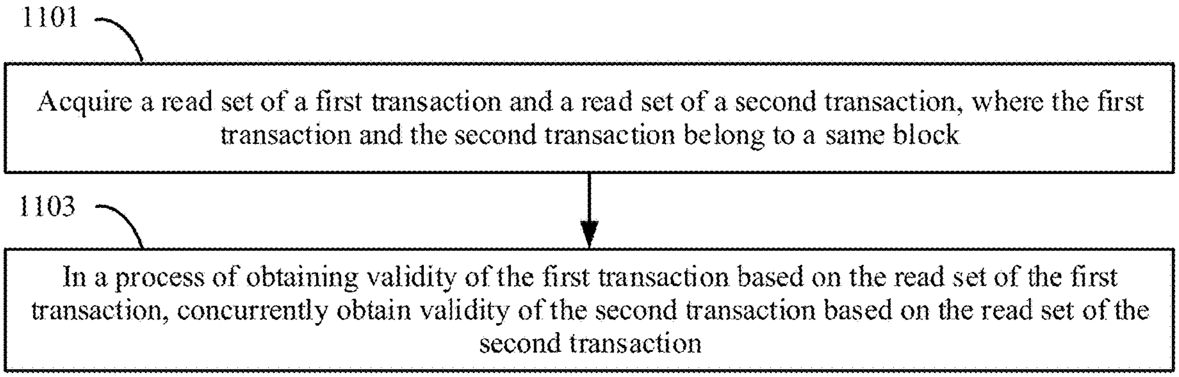
FIG. 11 is a flowchart of a data processing method according to an embodiment of this application.

As shown in FIG. 11, the method includes the following operations:

- operation 1101: acquiring a read set of a first transaction and a read set of a second transaction, where the first transaction and the second transaction belong to a same block; and
- operation 1103: in a process of obtaining validity of the first transaction based on the read set of the first transaction, concurrently obtaining validity of the second transaction based on the read set of the second transaction.

In some embodiments, a cache of the first node stores write sets included in a plurality of flushed blocks in the blockchain system and block heights corresponding to the plurality of flushed blocks; the method further includes: acquiring a first block height, where the first block height is a maximum block height in the blockchain system when the first transaction is endorsed; and the obtaining validity of the first transaction based on the read set of the first transaction includes: obtaining the validity of the first transaction based on the read set of the first transaction and the write sets included in the plurality of flushed blocks.

In some embodiments, the method further includes: acquiring a second block height, where the second block height is a maximum block height in the blockchain system when the second transaction is endorsed; and the obtaining validity of the second transaction based on the read set of the second transaction includes: obtaining the validity of the second transaction based on the read set of the second transaction and the write sets included in the plurality of flushed blocks.

In some embodiments, the obtaining validity of the second transaction based on the read set of the second transaction includes: acquiring, from a status database of the first node, a first key value of a key corresponding to the read set of the second transaction; and obtaining the validity of the second transaction based on the read set of the second transaction and the first key value.

In some embodiments, the obtaining validity of the first transaction based on the read set of the first transaction includes: acquiring, from a status database of the first node, a second key value of a key corresponding to the read set of the first transaction; and obtaining the validity of the first transaction based on the read set of the first transaction and the second key value.

According to the data processing method provided in this embodiment of this application, isolation of a plurality of transactions in a same block can be simultaneously validated, so that the block can be flushed as soon as possible, thereby improving performance of the blockchain system.

Figure 12:
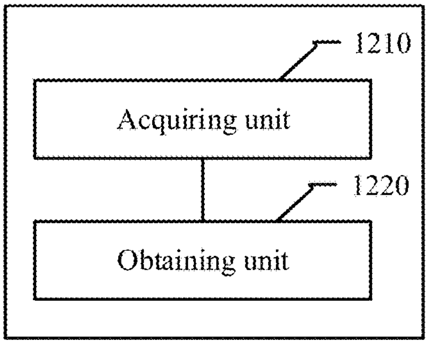
FIG. 12 is a diagram of a structure of a data processing apparatus according to an embodiment of this application.

An embodiment of this application provides a data processing apparatus. The apparatus includes functional units configured to implement the method shown in FIG. 10. Refer to FIG. 12. The apparatus may include the following functional units:

- an acquiring unit 1210, configured to: acquire a read set of a first transaction, and acquire a first block height, where the first block height is a maximum block height in a blockchain system when the first transaction is endorsed, and a cache of a first node stores write sets included in a plurality of flushed blocks in the blockchain system and block heights corresponding to the plurality of flushed blocks; and
- an obtaining unit 1220, configured to: when the first block height falls within a range of the block heights corresponding to the plurality of flushed blocks, obtain validity of the first transaction based on the read set of the first transaction and the write sets included in the plurality of flushed blocks.

The functional units of the apparatus may be implemented with reference to the method embodiments shown in FIG. 4 to FIG. 10, for example, the method embodiment shown in FIG. 10. Details are not described herein again.

An embodiment of this application provides a data processing apparatus. The apparatus includes functional units configured to implement the method shown in FIG. 11. Still refer to FIG. 12. The apparatus may include the following functional units:

- an acquiring unit 1210, configured to: acquire a read set of a first transaction, and acquire a first block height, where the first block height is a maximum block height in a blockchain system when the first transaction is endorsed, and a cache of a first node stores write sets included in a plurality of flushed blocks in the blockchain system and block heights corresponding to the plurality of flushed blocks; and
- an obtaining unit 1220, configured to: when the first block height falls within a range of the block heights corresponding to the plurality of flushed blocks, obtain validity of the first transaction based on the read set of the first transaction and the write sets included in the plurality of flushed blocks.

The functional units of the apparatus may be implemented with reference to the method embodiments shown in FIG. 4 to FIG. 9 and FIG. 11, for example, the method embodiment shown in FIG. 11. Details are not described herein again.

The apparatuses provided in embodiments of this application are mainly described above from a perspective of a method procedure. It may be understood that, to implement the foregoing functions, the terminals include corresponding hardware structures and/or software modules for performing the functions. A person skilled in the art should be easily aware that, with reference to units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

Figure 13:
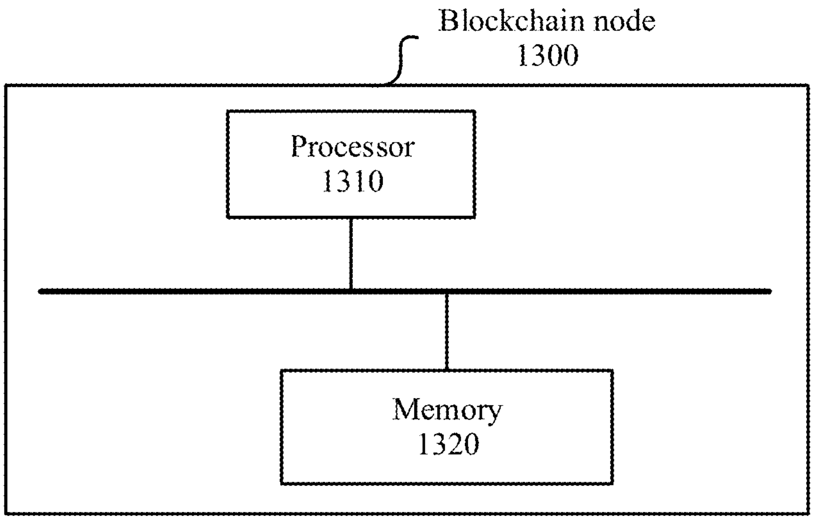
FIG. 13 is a diagram of a structure of a blockchain node according to an embodiment of this application.

Referring to FIG. 13, an embodiment of this application provides a blockchain node 1300. The blockchain node 1300 may perform operations performed by the ledger node or the first node in embodiments shown in FIG. 4 to FIG. 11, for example, may perform an operation of the first node in the embodiment shown in FIG. 10, and for another example, may perform an operation of the first node in the embodiment shown in FIG. 11. The blockchain node 1300 may include a processor 1310 and a memory 1320. The memory 1320 stores instructions, and the instructions may be executed by the processor 1310. When the instructions are executed by the processor 1310, the blockchain node 1300 may perform an operation performed by the ledger node or the first node in the foregoing method embodiments, for example, may perform an operation of the first node in the embodiment shown in FIG. 10 or FIG. 11.

It may be understood that, the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

The method operations in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information in the storage medium. Certainly, the storage medium may be a component of the processor. The processor and the storage medium may be disposed in an ASIC.

All or some of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be understood that various numbers in embodiments of this application are merely used for differentiation for ease of description, and are not used to limit the scope of embodiments of this application.

What is claimed is:

1. A data processing method, comprising:

acquiring, at a first node in a blockchain system, a read set of a first transaction, wherein a cache of the first node stores write sets comprised in a plurality of flushed blocks in the blockchain system and block heights corresponding to the plurality of flushed blocks;

acquiring a first block height, wherein the first block height is a maximum block height in the blockchain system and the first transaction is endorsed; and obtaining validity of the first transaction based on the read set of the first transaction and the write sets comprised in the plurality of flushed blocks, wherein the first block height falls within a range of the block heights corresponding to the plurality of flushed blocks.

2. The data processing method according to claim 1, wherein the range of the block heights corresponding to the plurality of flushed blocks is $[B_h-n+1, B_h]$, and when the first block height is greater than or equal to $B_h-n+1$, the first block height falls within the range of the block heights corresponding to the plurality of flushed blocks, wherein n is an integer greater than or equal to 1, and $B_h$ is an integer greater than or equal to 0.

3. The data processing method according to claim 2, wherein $B_h$ is a maximum block height in the blockchain system when a block to which the first transaction belongs is generated.

4. The data processing method according to claim 1, wherein the data processing method further comprises:

when the first block height falls outside the range of the block heights corresponding to the plurality of flushed blocks, acquiring, from a status database of the first node, a first key value of a key corresponding to the read set of the first transaction; and obtaining the validity of the first transaction based on the read set of the first transaction and the first key value.

5. The data processing method according to claim 1, wherein the blockchain system further comprises a first endorser and a second endorser that are configured to endorse the first transaction; and the acquiring a first block height comprises:

acquiring a second block height, wherein the second block height is a maximum block height in the blockchain system when the first transaction is endorsed by the first endorser;

acquiring a third block height, wherein the third block height is a maximum block height in the blockchain system when the first transaction is endorsed by the second endorser; and designating a smaller one of the second block height and the third block height as the first block height.

6. The data processing method according to claim 1, wherein the data processing method further comprises:

acquiring a read set of a second transaction, wherein the first transaction and the second transaction belong to a same block; and obtaining the validity of the first transaction based on the read set of the first transaction and the write sets comprised in the plurality of flushed blocks, and concurrently obtaining validity of the second transaction based on the read set of the second transaction.

7. The data processing method according to claim 1, wherein the obtaining validity of the first transaction based on the read set of the first transaction and the write sets comprised in the plurality of flushed blocks comprises:

when the read set of the first transaction conflicts with a write set of a third transaction, determining that the first transaction is invalid, wherein the third transaction is comprised in the plurality of flushed blocks.

8. The data processing method according to claim 1, wherein the obtaining validity of the first transaction based on the read set of the first transaction and the write sets comprised in the plurality of flushed blocks comprises:

when the read set of the first transaction does not conflict with the write sets comprised in the plurality of flushed blocks, obtaining the validity of the first transaction based on the read set of the first transaction and a write set of a third transaction, wherein the third transaction is a transaction other than the first transaction in the block to which the first transaction belongs.

9. The data processing method according to claim 8, wherein the obtaining the validity of the first transaction based on the read set of the first transaction and a write set of a third transaction comprises:

when the first transaction does not depend on the write set of the third transaction, determining that the first transaction is valid; or when the first transaction depends on a write set of a fourth transaction in the third transaction, but the fourth transaction is invalid, determining that the first transaction is valid; or when the first transaction depends on a write set of a fourth transaction in the third transaction, and the fourth transaction is valid, determining that the first transaction is invalid.

10. A data processing method, applied to a first node in a blockchain system, wherein the method comprises:

acquiring a read set of a first transaction and a read set of a second transaction, wherein the first transaction and the second transaction belong to a same block, wherein a cache of the first node stores write sets comprised in a plurality of flushed blocks in the blockchain system and block heights corresponding to the plurality of flushed blocks; and acquiring a first block height, wherein the first block height is a maximum block height in the blockchain system and the first transaction is endorsed;

obtaining validity of the first transaction based on the read set of the first transaction, and concurrently obtaining validity of the second transaction based on the read set of the second transaction, wherein the obtaining validity of the first transaction based on the read set of the first transaction comprises: obtaining the validity of the first transaction based on the read set of the first transaction and the write sets comprised in the plurality of flushed blocks.

11. The method according to claim 10, wherein the method further comprises: acquiring a second block height, wherein the second block height is a maximum block height in the blockchain system when the second transaction is endorsed; and the obtaining validity of the second transaction based on the read set of the second transaction comprises: obtaining the validity of the second transaction based on the read set of the second transaction and the write sets comprised in the plurality of flushed blocks.

12. The method according to claim 11, wherein the obtaining validity of the second transaction based on the read set of the second transaction comprises:

acquiring, from a status database of the first node, a first key value of a key corresponding to the read set of the second transaction; and obtaining the validity of the second transaction based on the read set of the second transaction and the first key value.

13. The method according to claim 10, wherein the obtaining validity of the first transaction based on the read set of the first transaction comprises:

acquiring, from a status database of the first node, a second key value of a key corresponding to the read set of the first transaction; and obtaining the validity of the first transaction based on the read set of the first transaction and the second key value.

14. An apparatus operating as a first node in a blockchain system, comprising:

a processor, and a memory coupled to the processor and configured to store a plurality of instructions that, when executed by the processor, causes the processor to:

acquire a read set of a first transaction, wherein a cache of the first node stores write sets comprised in a plurality of flushed blocks in the blockchain system and block heights corresponding to the plurality of flushed blocks, acquire a first block height, wherein the first block height is a maximum block height in the blockchain system and the first transaction is endorsed, and obtain validity of the first transaction based on the read set of the first transaction and the write sets comprised in the plurality of flushed blocks, wherein the first block height falls within a range of the block heights corresponding to the plurality of flushed blocks.

15. The apparatus according to claim 14, wherein the range of the block heights corresponding to the plurality of flushed blocks is $[B_h-n+1, B_h]$, and when the first block height is greater than or equal to $B_h-n+1$, the first block height falls within the range of the block heights corresponding to the plurality of flushed blocks, wherein n is an integer greater than or equal to 1, and $B_h$ is an integer greater than or equal to 0.

16. The apparatus according to claim 15, wherein $B_h$ is a maximum block height in the blockchain system when a block to which the first transaction belongs is generated.

17. The apparatus according to claim 14, wherein the instructions, when executed, further cause the processor to:

when the first block height falls outside the range of the block heights corresponding to the plurality of flushed blocks, acquire, from a status database of the first node, a first key value of a key corresponding to the read set of the first transaction; and obtain the validity of the first transaction based on the read set of the first transaction and the first key value.

18. The apparatus according to claim 14, wherein the blockchain system further comprises a first endorser and a second endorser that are configured to endorse the first transaction; and the acquiring a first block height further causes the processor to:

acquire a second block height, wherein the second block height is a maximum block height in the blockchain system when the first transaction is endorsed by the first endorser;

acquire a third block height, wherein the third block height is a maximum block height in the blockchain system when the first transaction is endorsed by the second endorser; and designate a smaller one of the second block height and the third block height as the first block height.

19. The apparatus according to claim 14, wherein the instructions, when executed, further cause the processor to:

acquire a read set of a second transaction, wherein the first transaction and the second transaction belong to a same block; and in a process of obtaining the validity of the first transaction based on the read set of the first transaction and the write sets comprised in the plurality of flushed blocks, concurrently obtain validity of the second transaction based on the read set of the second transaction.

* * * * *